(12) United States Patent
Guo et al.

(10) Patent No.: US 10,455,428 B2
(45) Date of Patent: Oct. 22, 2019

(54) SYSTEM AND METHOD FOR MANAGING UTILIZATION OF UN-LICENSED FREQUENCY SPECTRUM RESOURCES FOR SECONDARY SYSTEMS, AND A NON-TRANSITORY COMPUTER-READABLE MEDIUM

(71) Applicant: SONY CORPORATION, Tokyo (JP)

(72) Inventors: Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 180 days.

(21) Appl. No.: 14/787,694

(22) PCT Filed: May 30, 2014

(86) PCT No.: PCT/CN2014/078963
§ 371 (c)(1),
(2) Date: Oct. 28, 2015

(87) PCT Pub. No.: WO2014/190941
PCT Pub. Date: Dec. 4, 2014

(65) Prior Publication Data
US 2016/0088485 A1    Mar. 24, 2016

(30) Foreign Application Priority Data

May 30, 2013   (CN) .......................... 2013 1 0208447

(51) Int. Cl.
*H04W 16/14*   (2009.01)
*H04W 28/16*   (2009.01)

(52) U.S. Cl.
CPC ........... *H04W 16/14* (2013.01); *H04W 28/16* (2013.01)

(58) Field of Classification Search
CPC . H04W 16/14; H04W 72/04; H04W 72/0406; H04W 72/0453; H04W 72/0473; H04W 72/082; H04L 27/0006
See application file for complete search history.

(56) References Cited

U.S. PATENT DOCUMENTS

| 2008/0108365 A1* | 5/2008 | Buddhikot | ............ | H04W 16/10 455/452.1 |
| 2010/0046440 A1* | 2/2010 | Singh | .................... | H04W 4/021 370/329 |

(Continued)

FOREIGN PATENT DOCUMENTS

| CN | 102812772 A | 12/2012 |
| CN | 102857972 A | 1/2013 |

(Continued)

OTHER PUBLICATIONS

International Search Report dated Aug. 20, 2014, in PCT/CN2014/078963 filed May 30, 2014.

(Continued)

*Primary Examiner* — Scott M Sciacca
(74) *Attorney, Agent, or Firm* — Xsensus LLP

(57) ABSTRACT

A system and method for managing utilization of un-licensed frequency spectrum resources for secondary systems, a system and a method for the system, and a non-transitory computer-readable medium including computer-readable instructions. The system for managing utilization of un-licensed frequency spectrum resources for secondary systems includes: circuitry, configured to assign a first un-licensed frequency spectrum resource in an availability time period to a first secondary system and reassign at least part of the first un-licensed frequency spectrum resource during the availability time period based on current resource utilization, wherein the circuitry is configured to assign and reassign the first un-licensed frequency spectrum resource (Continued)

under protection of a primary system which is licensed with the un-licensed frequency spectrum resources.

17 Claims, 10 Drawing Sheets

(56) References Cited

U.S. PATENT DOCUMENTS

| | | | | |
|---|---|---|---|---|
| 2011/0070838 A1* | 3/2011 | Caulfield | ............... | H04W 16/14 455/62 |
| 2011/0228666 A1 | 9/2011 | Barbieri et al. | | |
| 2012/0063373 A1* | 3/2012 | Chincholi | ............... | H04L 5/001 370/281 |
| 2012/0184318 A1* | 7/2012 | Lee | ............... | H04W 16/14 455/515 |
| 2012/0281637 A1* | 11/2012 | Junell | ............... | H04W 16/14 370/329 |
| 2014/0120940 A1 | 5/2014 | Ren et al. | | |
| 2014/0148191 A1 | 5/2014 | Feng et al. | | |
| 2015/0126207 A1* | 5/2015 | Li | ............... | H04W 72/082 455/452.1 |
| 2015/0131536 A1* | 5/2015 | Kaur | ............... | H04L 5/001 370/329 |

FOREIGN PATENT DOCUMENTS

| | | |
|---|---|---|
| CN | 102917456 A | 2/2013 |
| JP | 2009153136 A | 7/2009 |
| JP | 2011176508 A | 9/2011 |
| JP | 2012213701 A | 11/2012 |
| WO | 2012028769 A1 | 3/2012 |
| WO | 2012078565 A1 | 6/2012 |

OTHER PUBLICATIONS

Written Opinion of the International Searching Authority dated Aug. 19, 2014, in PCT/CN2014/078963 filed May 30, 2014.
Search Report and Office Action issued in Chinese Application 201310208447.3 dated Jun. 5, 2018.
ETSI TR 103 067 V1.1.1, "Reconfigurable Radio Systems (RRS); Feasibility study on Radio Frequency (RF) Performance for Cognitive Radio Systems Operating in UHF TV Band White Spaces", 120 Pages total, (May 2013).

* cited by examiner

SYSTEM AND METHOD FOR MANAGING UTILIZATION OF UN-LICENSED FREQUENCY SPECTRUM RESOURCES FOR SECONDARY SYSTEMS, AND A NON-TRANSITORY COMPUTER-READABLE MEDIUM

FIELD OF THE INVENTION

The present disclosure relates to frequency spectrum resource management in wireless communication, in particular to a frequency spectrum resource management apparatus, method, system, and secondary system apparatus for a communication system including primary systems and secondary systems.

BACKGROUND OF THE INVENTION

In the field of wireless communication, in order to maximize the utilization of frequency spectrum resources, generally, the frequency spectrum resources are allocated to the secondary systems included in a communication system in a way of dynamic frequency spectrum management under the premise of ensuring the frequency spectrum usage of primary systems in the communication system. However, the allocation of frequency spectrum resource has a certain historical inheritance, that is, the frequency spectrum resource will retain in, for example, a certain secondary system for a certain time when being allocated to the secondary system, and the subsequent allocation of frequency spectrum resources will be carried out under the constraints of the existing allocation results. Furthermore, since the density of network coverage, the network layout complexity and the difference between the priorities of frequency spectrum usage strengthen the constraint condition for subsequent allocation of frequency spectrum resources, the difference between the result of allocation of frequency spectrum resources and the optimal result of allocation of frequency spectrum resources under current constraint condition is increasing with the variation of network state (such as the generation and completion of new service, the transfer of user), resulting in inefficient use of frequency spectrum resources.

SUMMARY OF THE INVENTION

A brief summary of the present disclosure is given below, so as to provide a basic understanding on some aspects of the present disclosure. It will be appreciated that the summary is not an exhaustive description of the present disclosure. It is not intended to define a key or important part of the present disclosure, nor is it intended to limit the scope of the present disclosure. It aims to give some concepts in a simplified form, as a preface to the more detailed description described later.

In view of above drawbacks of the prior art, an object of the present disclosure is to provide a frequency spectrum resource management apparatus, method, system, and secondary system apparatus for a communication system including primary systems and secondary systems, to overcome at least the problems in the prior art.

According to an embodiment of the present disclosure, there is provided a system for managing utilization of un-licensed frequency spectrum resources for secondary systems, comprising circuitry configured to assign a first un-licensed frequency spectrum resource in an availability time period to a first secondary system, and reassign at least part of the first un-licensed frequency spectrum resource during the availability time period based on current resource utilization, wherein the circuitry is configured to assign and reassign the first un-licensed frequency spectrum resource under protection of a primary system which is licensed with the un-licensed frequency spectrum resources.

According to another embodiment of the present disclosure, there is provided a method for managing utilization of un-licensed frequency spectrum resources for secondary systems, comprising: assigning a first un-licensed frequency spectrum resource in an availability time period to a first secondary system; and reassigning at least part of the first un-licensed frequency spectrum resource during the availability time period based on current resource utilization, wherein the steps of assigning and reassigning the first un-licensed frequency spectrum resource are under protection of a primary system which is licensed with the un-licensed frequency spectrum resources.

According to yet another embodiment of the present disclosure, there is provided a system, comprising: circuitry configured to determine a first un-licensed frequency spectrum resource available to the system in an availability time period, receive a spectrum adjustment information during the availability time period that indicates at least part of the first un-licensed frequency spectrum resource no longer available to the system, and change operational parameters of the system based on the spectrum adjustment information, wherein the system operates on the first un-licensed frequency spectrum resource under protection of a primary system which is licensed with the un-licensed frequency spectrum resources.

According to still yet another embodiment of the present disclosure, there is provided a method for a system, comprising: determining a first un-licensed frequency spectrum resource available to the system in an availability time period; receiving a spectrum adjustment information during the availability time period that indicates at least part of the first un-licensed frequency spectrum resource no longer available to the system; and changing operational parameters of the system based on the spectrum adjustment information, wherein the system operates on the first un-licensed frequency spectrum resource under protection of a primary system which is licensed with the un-licensed frequency spectrum resources.

According to still yet another embodiment of the present disclosure, there is provided a non-transitory computer-readable medium including computer-readable instructions, which when executed by a system for managing utilization of un-licensed frequency spectrum resources for secondary systems, cause the system to assign a first un-licensed frequency spectrum resource in an availability time period to a first secondary system, and reassign at least part of the first un-licensed frequency spectrum resource during the availability time period based on current resource utilization, wherein the system assigns and reassigns the first un-licensed frequency spectrum resource under protection of a primary system which is licensed with the un-licensed frequency spectrum resources.

In addition, embodiments of the present disclosure provide a computer program for implementing the above frequency spectrum resource management method.

In addition, embodiments of the present disclosure provide a corresponding computer-readable storage medium having stored thereon a computer program code for implementing the above frequency spectrum resource management method.

The system and method for managing utilization of unlicensed frequency spectrum resources for secondary systems and the non-transitory computer-readable medium according to embodiments of the present disclosure can realize at least one of the following beneficial effects: capable of improve the usage ratio of the frequency spectrum resource; and capable of improve the adjustment efficiency of the frequency spectrum resource.

Through the following detailed description in conjunction with the accompanying drawings of the best mode of the present disclosure, these and other advantages of the present disclosure will become more apparent.

BRIEF DESCRIPTION OF THE DRAWINGS

The disclosure may be understood better by referring to description provided in conjunction with the accompanying drawings, wherein the same or similar reference signs are used to represent the same or similar components in all of the figures. The figures and the following detailed description are included in the specification and form a part of the specification, and used to further explain preferred embodiments of the present disclosure and explain principle and object of the present disclosure by examples. Wherein.

Figure 1:
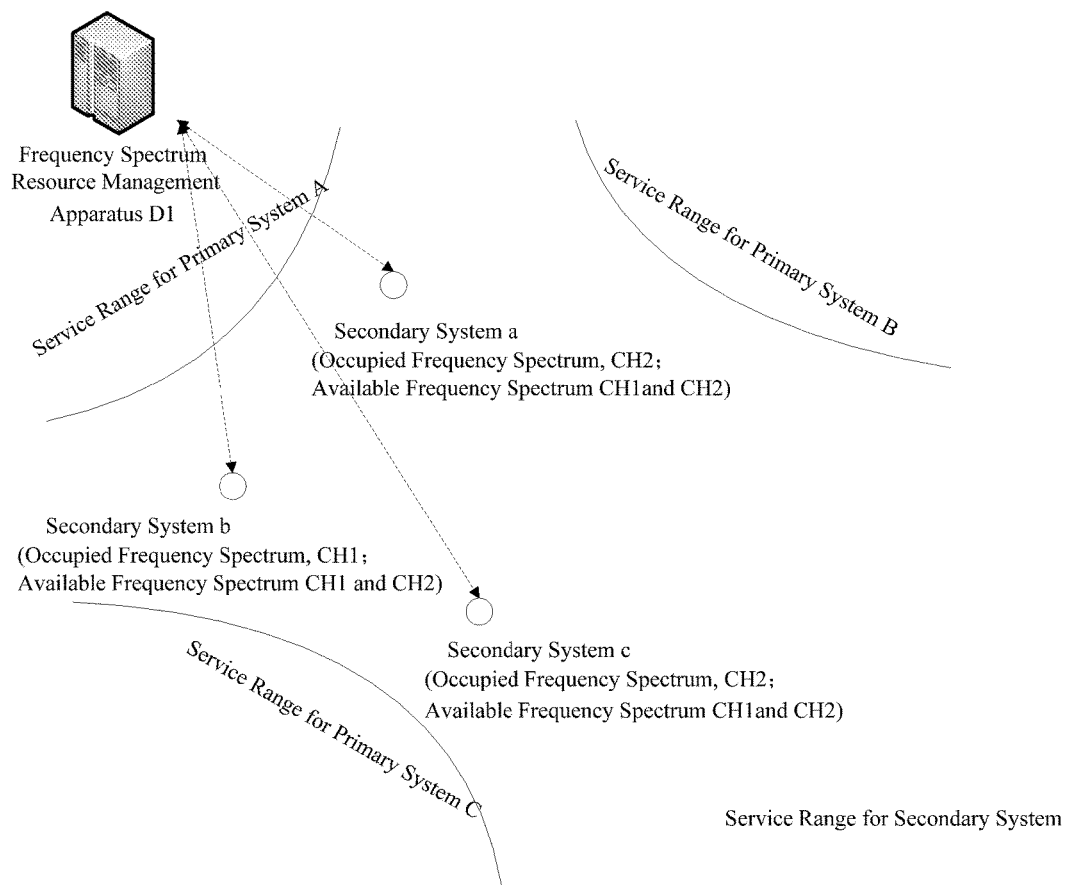
FIG. 1 illustrates a schematic view of an example of a communication system including primary systems and secondary systems.

The skilled person should understand that elements in the figures are illustrated for simplicity and clarity, and are not necessarily drawn to scale. For example, the size of some of the elements in the accompanying drawings may be enlarged with respect to other elements, so as to facilitate improving the understanding of embodiments of the present disclosure.

DETAILED DESCRIPTION OF THE INVENTION

Exemplary embodiments of the present disclosure will be described hereinafter in conjunction with the accompanying drawings. For the sake of clarity and simplicity, not all the features of an actual implementation are described in the specification. However, it will be appreciated that in the development of any actual embodiment, numerous implementation-specific decisions shall be made in order to achieve the developer's specific goals, such as compliance with system-related and business-related constraints, which may vary from one implementation to another. Moreover, it will be appreciated that such development effort might be very complex and time-consuming, but would nevertheless be a routine undertaking for those skilled in the art having the benefit of the present disclosure.

A point need to be further explained here is that, only those apparatus structures and/or processing steps that are closely related to the technical solutions of the present disclosure are shown in the figures in order to avoid unnecessarily obscuring the present disclosure by unnecessary details, other details that are not closely related to the present invention are omitted.

As to a communication system including primary systems and secondary systems, in order to make the primary systems and the secondary systems to reasonably utilize the frequency spectrum resource at the time of reducing mutual interference over the same frequency spectrum or adjacent frequency spectrums, the present disclosure proposes a method for optimize the frequency spectrum usage of secondary systems in the case of ensuring that no interference is brought to primary systems, so as to make full use of the limited frequency spectrum resources. Usually, the primary system includes primary base stations and primary users, and the secondary system includes secondary base stations and secondary users. According to the present disclosure, the primary system may be a system that has an licensed frequency spectrum usage right, correspondingly, the secondary system may be a system that does not have an licensed frequency spectrum usage right; according to another example of the present disclosure, the primary system may be a system that has a frequency spectrum usage right at the same time with the secondary system but has a frequency spectrum usage priority higher than that of the secondary system. In this case, the secondary system can use the licensed frequency spectrum together with the primary system when and only when it does not bring interference to the primary system. The concepts of the primary system and the secondary system are well known in the art, so the detailed description thereof will be omitted here.

FIG. 1 illustrates a schematic view of an example of a communication system including primary systems and secondary systems.

The communication system shown in FIG. 1 includes three primary systems A, B, C, three secondary systems a, b, c and a frequency spectrum resource management apparatus D1 for managing the frequency spectrum resource of secondary systems.

The communication system shown in FIG. 1 is merely an example, those skilled in the art will understand that primary systems and secondary systems included in the communication system may have other numbers, for example, the communication system includes two or four or more than four primary systems, etc.

It should be noted here that, as to the communication system that includes primary systems and secondary systems, when the network state is varied (for example, there exists a secondary system having new resource demand and there is a need to allocate frequency spectrum resources to the secondary system) and the frequency spectrum resources need to be adjusted, at least the external constraint condition needs to be satisfied, that is, the interference brought to the primary systems (such as the primary systems A, B, C shown in FIG. 1) by the secondary system when using the frequency spectrum is within the allowable range of the primary system. Furthermore, in some cases (especially the case that the secondary system that has been allocated a frequency spectrum resource has a priority higher than that of the secondary system requesting for resources), the internal constraint condition needs to be satisfied at the same time, that is, the interference between the secondary systems (such as the secondary systems a, b shown in FIG. 1) is also within the allowable range.

Figure 2:
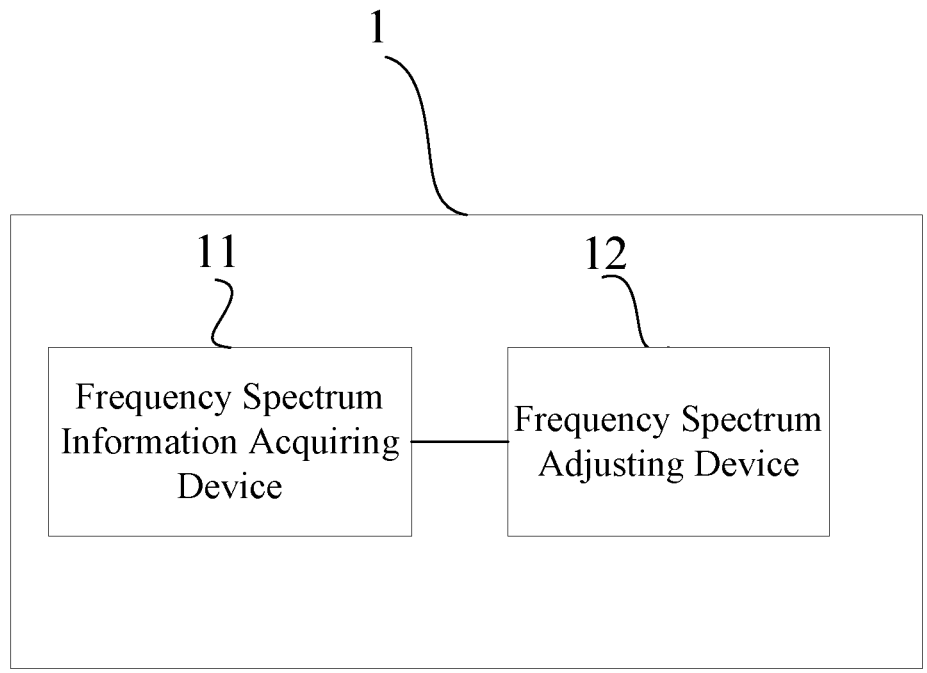
FIG. 2 is a structural block diagram schematically illustrating a frequency spectrum resource management apparatus according to the first embodiment of the present disclosure.

FIG. 2 is a structure block diagram schematically illustrating a frequency spectrum resource management apparatus according to the first embodiment of the present disclosure.

As shown in FIG. 2, the frequency spectrum resource management apparatus 1 according to an embodiment of the present disclosure comprises: a frequency spectrum information acquiring device 11, configured for acquiring available frequency spectrum information and occupied frequency spectrum information regarding respective frequency spectrum resource adjusting units managed by the frequency spectrum resource management apparatus 1, wherein, the available frequency spectrum information corresponds to available frequency spectrum related information of respective frequency spectrum resource adjusting units under the condition that the interferences on the primary systems caused by respective frequency spectrum resource adjusting units are within allowable range of the primary systems, the occupied frequency spectrum information corresponds to occupied frequency spectrum related information that has been allocated to respective frequency spectrum resource adjusting units for occupancy; and a frequency spectrum adjusting device 12, configured for determining the frequency spectrum adjustment to at least part of frequency spectrum resource adjusting units in the plurality of the frequency spectrum resource adjusting units, at least based on the available frequency spectrum information and the occupied frequency spectrum information of respective frequency spectrum resource adjusting units.

According to an embodiment of the present disclosure, the frequency spectrum adjusting device can be used either for determining the frequency spectrum adjustment for the plurality of the frequency spectrum resource adjusting units within a length of limitation period for the occupied frequency spectrum information, or for determining the frequency spectrum adjustment to the plurality of the frequency spectrum resource adjusting units when the frequency spectrum allocated to the frequency spectrum resource adjusting units is invalid. Compared with the case that the adjustment is made to the frequency spectrum usage of all frequency spectrum resource adjusting units only when the frequency spectrum allocated to the frequency spectrum resource adjusting units is invalid in the prior art, the frequency spectrum resource management apparatus according to an embodiment of the present disclosure can realize the high efficient usage of frequency spectrum resources.

The available frequency spectrum information is the information about available frequency spectrum resources of different locations in the service range of the secondary system determined from the limitation of external constraint condition. According to the limitation of external constraint condition, the available resources (the frequency spectrum and maximum power) of different locations in the service range of the secondary system are different, as to each frequency spectrum resource adjusting unit, the frequency spectrum information acquiring device 11 of the frequency spectrum resource management apparatus 1 can obtain the available frequency spectrum information of the location of the frequency spectrum resource adjusting unit from, for example, the geographic location database (GLDB) according to the location, as the available frequency spectrum information of the frequency spectrum resource adjusting unit. The definition of geographic location database and the specific method for determining the available frequency spectrum information is an existing technology, which can be referred to reference documentation 'Draft of ECC report: Technical and operational requirements for the operation of white space devices under geo-location approach' CEPT, ECC186, January 2013, and the detailed description is omitted here.

The occupied frequency spectrum information is the frequency spectrum having been allocated to respective frequency spectrum resource adjusting unit for occupancy. The frequency spectrum having been allocated to respective frequency spectrum resource adjusting unit for occupancy can be either used by the frequency spectrum resource adjusting unit, or not be used because the frequency spectrum resource adjusting unit has no resource demand at present, or be used partially. Since the frequency spectrum resource management apparatus 1 can be used to perform frequency spectrum resource allocation for the frequency spectrum resource adjusting unit, it will maintain the allocated resource of each frequency spectrum resource adjusting unit, such that the frequency spectrum information acquiring device 11 of the frequency spectrum resource management apparatus 1 obtains the occupied frequency spectrum information of respective frequency spectrum resource adjusting unit.

According to an embodiment of the present disclosure, the frequency spectrum resource adjusting unit in a communication system can be either single secondary system in the communication system (such as a structure including only one secondary base station and secondary users thereof), or a group of secondary systems in the communication system (such as a structure including a plurality of secondary base stations and secondary users thereof), and can be either single user in the secondary system, or a group of secondary users in the communication system. In the case of a group of secondary users or a group of secondary systems, the secondary users or the secondary systems that have same priorities or same distributed regions may be selected as a group of secondary users or a group of secondary systems, for example, according to the frequency spectrum usage priorities or regional distribution characteristics of the secondary users or the secondary systems.

The frequency spectrum resource management apparatus 1 according to the first embodiment of the present disclosure may correspond to the frequency spectrum resource management apparatus D1 for managing the secondary systems a, b, c shown in FIG. 1.

In the example shown in FIG. 1 in which the communication system includes three primary systems and three secondary systems and a single secondary system is taken as a frequency spectrum resource adjusting unit in the communication system, the frequency spectrum information acquiring device 11 of the frequency spectrum resource management apparatus 1 may obtain the available frequency spectrums (all being CH1 and CH2) of the secondary systems a, b, c, for example, from the geographic location database (GLDB, as shown in figures), and the frequency spectrum information acquiring device 11 can obtain the occupied frequency spectrums (CH2, CH1, CH2 respectively) of the secondary systems a, b, c maintained by the frequency spectrum resource management apparatus 1.

According to an embodiment of the present disclosure, the frequency spectrum information acquiring device 11 may obtain the available frequency spectrum information and the occupied frequency spectrum information regarding respective frequency spectrum resource adjusting unit managed by the frequency spectrum resource management apparatus at each of the predetermined timings.

Since the adjustment to the frequency spectrum usage of respective frequency spectrum resource adjusting unit needs to consume a certain calculation amount and apparatus power consumption, it need to choose a suitable chance and frequency to perform the adjustment. According to an embodiment of the present disclosure, the frequency spectrum information acquiring device 11 is further configured for acquiring information regarding requests for frequency spectrum resources and information regarding frequency spectrum resources in idle. Furthermore, according to an embodiment of the present disclosure, the frequency spectrum adjusting device 12 is configured for determining the frequency spectrum adjustment to at least part of frequency spectrum resource adjusting units in the plurality of the frequency spectrum resource adjusting units managed by the frequency spectrum resource management apparatus, when at least one of the following conditions is satisfied:

condition i, there are frequency spectrum resources in idle and frequency spectrum resource adjusting units requesting for frequency spectrum resources in the communication system;

condition ii, as to an assessing object comprising at least two frequency spectrum adjusting units, the difference between the predicted throughput and the current throughput is larger than a predetermined threshold, wherein the predicted throughput is calculated when the occupancy of the frequency spectrum resources by the frequency spectrum resource adjusting units is under the allowed range for the interference of the primary system; and condition iii, a frequency spectrum resource adjusting unit requesting for frequency spectrum resources existing in the communication system does not obtain frequency spectrum within a predetermined period of time.

According to an embodiment of the present disclosure, the frequency spectrum resources in idle includes the frequency spectrum resources released by the frequency spectrum resource adjusting unit that has been allocated the frequency spectrum resources and the frequency spectrum resources having not been allocated to any frequency spectrum resource adjusting unit for occupancy.

According to one embodiment of the present disclosure, the frequency spectrum information acquiring device 11 is further configured for receiving, from frequency spectrum resource adjusting units occupying frequency spectrum, information regarding its released frequency spectrum resource and taking the released frequency spectrum as frequency spectrum in idle.

In the following, the above conditions for triggering the frequency spectrum resource adjustment will be sequentially described in detail.

As to condition i, for example, when there are frequency spectrum resource adjusting units of which the frequency spectrum resources are released and frequency spectrum resource adjusting unit requesting for frequency spectrum resources in the communication system, or, there are frequency spectrum resource adjusting units that have frequency spectrum resources not being occupied by any frequency spectrum resource adjusting unit and frequency spectrum resource adjusting unit that has request for frequency spectrum resources in the communication system, it can be considered that condition i is satisfied, in this case, the frequency spectrum adjusting device 12 triggers the determination of the adjustment to at least part of frequency spectrum resource adjusting units in the plurality of the frequency spectrum resource adjusting units.

As to condition ii, the frequency spectrum adjusting device 12 may perform system capacity assessment periodically with respect to the assessing object comprising at least two frequency spectrum adjusting units, and start up the adjustment to at least part of frequency spectrum resource adjusting units in the plurality of the frequency spectrum resource adjusting units in the case that the difference between the predicted throughput and the current throughput is larger than a predetermined threshold, wherein the predicted throughput is calculated when the occupancy of the frequency spectrum resources by the frequency spectrum resource adjusting units is under the allowed range for the interference of the primary system. Specifically, for example, the re-allocation is performed to corresponding frequency spectrum resource according to the external constraint condition and/or the internal constraint condition, and the obtained throughout is recorded as the predicted system capacity; the throughput generated from the current allocation result is recorded as the current throughput; if the difference between the predicted system capacity and the current system capacity exceeds the predetermined threshold of system capacity difference, the frequency spectrum adjusting device start up the determination of the adjustment to at least part of frequency spectrum resource adjusting units in the plurality of the frequency spectrum resource adjusting units. The period can be set according to the operation state history information of the system, one way is to perform system capacity assessment at initial stage by small interval, then gradually increase the interval, until the difference between the estimated system capacity and the current system capacity exceeds the predetermined threshold of system capacity difference; re-timing to repeat the operation; and take the mean value of time as the frequency for the period after several operations. Another way is to perform system capacity assessment once an operation causing network state variation presents at initial stage according to the number of operations causing network state variation (such as the generation and completion of new services, the transfer of user), until the difference between the estimated system capacity and the current system capacity exceeds the predetermined threshold of system capacity difference; re-timing to repeat the operation; and take the mean value of numbers of operations causing variation as the period frequency after several operations. The range of the assessing object selected by performing capacity assessment can include all secondary systems, part of secondary systems, part of secondary users, or the combination thereof, the selected part of frequency spectrum resource adjusting units may be the frequency spectrum resource adjusting units that have higher priorities and need better QoS protection.

As to condition iii, the frequency spectrum adjusting device 12 can start up the determination of the adjustment to at least part of frequency spectrum resource adjusting units in the plurality of the frequency spectrum resource adjusting units in the case that the frequency spectrum resource adjusting unit requesting for frequency spectrum resources in the communication system does not obtain frequency spectrum resources within a predetermined period of time. The predetermined period of time can be determined by timing, for example, a timer is initialized once the frequency spectrum resource adjusting unit issues frequency spectrum resource request, when the resource is not allocated until the predetermined time threshold is exceeded, it is judged that the frequency spectrum resource adjusting unit does not obtain the frequency spectrum resource in the predetermined period of time. It will be understood by those skilled in the art that, the time threshold can be arbitrarily set by the secondary system configuration.

Figure 3:
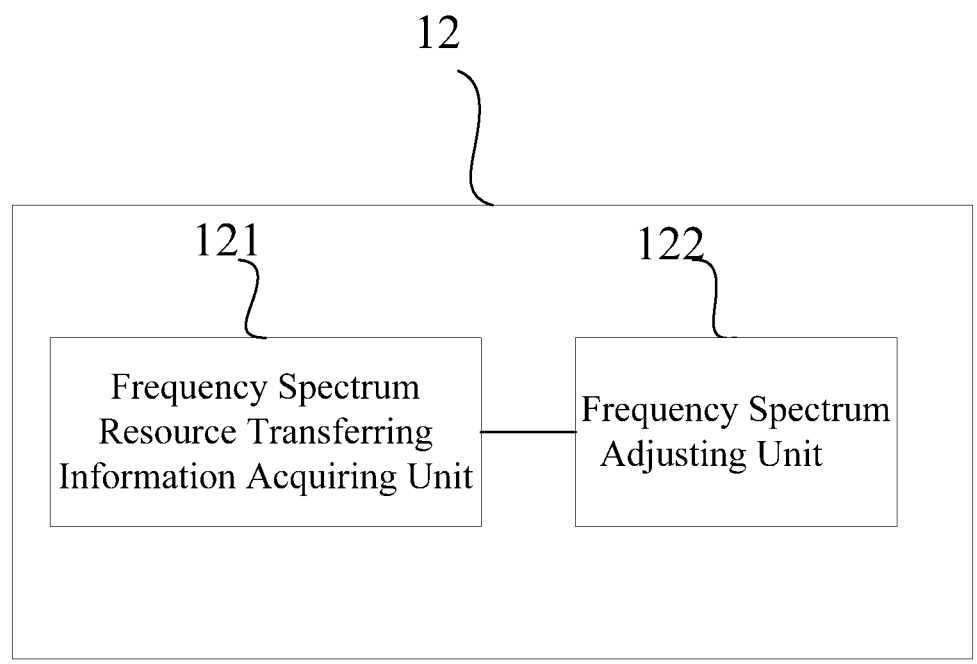
FIG. 3 is a schematic view illustrating an implementation of the frequency spectrum adjusting device shown in FIG. 2.

FIG. 3 is a schematic view illustrating an implementation of the frequency spectrum adjusting device 12 shown in FIG. 2.

As shown in FIG. 3, the frequency spectrum adjusting device 12 comprises: a frequency spectrum resource transferring information acquiring unit 121, configured for determining frequency spectrum resource transferring information between each two of the frequency spectrum resource adjusting units, based on the available frequency spectrum information and occupied frequency spectrum information regarding respective frequency spectrum resource adjusting units, wherein the frequency spectrum resource transferring information comprises information indicating whether the occupied frequency spectrum of a first frequency spectrum resource adjusting unit in the two frequency spectrum resource adjusting units belongs to the available frequency spectrum of the second frequency spectrum resource adjusting unit; and a frequency spectrum adjusting unit 122, configured for determining the frequency spectrum adjustment to respective frequency spectrum resource adjusting units according to the frequency spectrum resource transferring information.

According to an embodiment of the present disclosure, when the occupied frequency spectrum of a first frequency spectrum resource adjusting unit in the two frequency spectrum resource adjusting units belongs to the available frequency spectrum of the second frequency spectrum resource adjusting unit, it is indicated that the occupied frequency spectrum of the first frequency spectrum resource adjusting unit could be transferred to the second frequency spectrum resource adjusting unit for use. The frequency spectrum adjusting unit 122 can determine frequency spectrum adjustment to at least part of the frequency spectrum resource adjusting units according to the frequency spectrum resource transferring information that is determined by the frequency spectrum resource transferring information acquiring unit 121.

Specifically, with respect to the frequency spectrum resource adjustment performed under condition i, the frequency spectrum adjusting unit 122 is configured to determine the way of frequency spectrum transferring from the frequency spectrum resource adjusting unit corresponding to the frequency spectrum resource in idle to the frequency spectrum resource adjusting unit requesting for frequency spectrum resources, according to the frequency spectrum resource transferring information between the frequency spectrum resource adjusting units, to perform adjustment to the frequency spectrum occupancies of the frequency spectrum resource adjusting units related to the frequency spectrum transferring, so as to satisfy the frequency spectrum demand of the frequency spectrum resource adjusting unit requesting for frequency spectrum resources.

When the frequency spectrum resource adjustment is performed under condition ii, the frequency spectrum resource transferring information acquiring unit 121 further acquires the difference between the throughput generated by the second frequency spectrum resource adjusting unit of the two frequency spectrum resource adjusting units after occupying the occupied frequency spectrum of the first frequency spectrum resource adjusting unit and the throughput generated when occupying the currently occupied frequency spectrum, as the frequency spectrum resource transferring information. Therefore, when the frequency spectrum resource adjustment is performed under condition ii, the frequency spectrum adjusting unit 122 determines a frequency spectrum transferring manner for making the throughput of the assessment object consisting of at least two frequency spectrum resource adjusting units after frequency spectrum adjustment meet a predetermined condition, based on the frequency spectrum resource transferring information including the throughput information, so as to adjust the frequency spectrum occupancies for the frequency spectrum resource adjusting units related to the frequency spectrum transferring. According to an embodiment of the present disclosure, for example, the predetermined condition may be that the difference between the throughput of the estimating object after frequency spectrum adjustment and the throughput before frequency spectrum adjustment is larger than the predetermined threshold of system capacity difference. The predetermined threshold of system capacity difference may be arbitrarily set according to the specific requirement to the frequency spectrum resource adjustment, for example, it can be set to zero, that is, the adjustment to the frequency spectrum occupancy of the frequency spectrum resource adjusting unit is triggered when the throughput of the assessment object after frequency spectrum adjustment is larger than the throughput before frequency spectrum adjustment.

Figure 4:
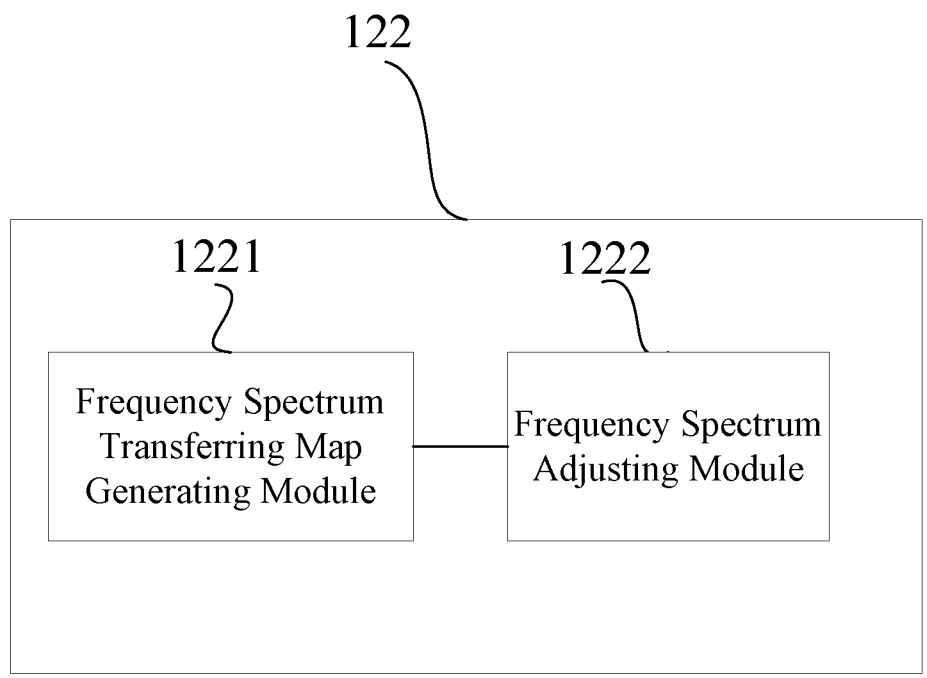
FIG. 4 is a schematic view illustrating an implementation of the frequency spectrum adjusting unit shown in FIG. 3.

FIG. 4 is a schematic view illustrating an implementation of the frequency spectrum adjusting unit 122 shown in FIG. 3.

See FIG. 4, the frequency spectrum adjusting unit 122 comprises a frequency spectrum transferring map generating module 1221 and a frequency spectrum adjusting module 1222.

As shown in FIG. 4, the frequency spectrum transferring map generating module 1221 generates a frequency spectrum transferring map according to the available frequency spectrum information and the occupied frequency spectrum information of respective frequency spectrum resource adjusting units, the frequency spectrum transferring map is generated in the following way: each vertex of the frequency spectrum transferring map represents one frequency spectrum resource adjusting unit, one directed arc taking the vertex representing the first frequency spectrum resource adjusting unit as a tail vertex and taking the vertex representing the second frequency spectrum resource adjusting unit as a head vertex is established, when the occupied frequency spectrum of the first frequency spectrum adjusting unit belongs to the available frequency spectrum of the second frequency spectrum adjusting unit and when the occupancy of the occupied frequency spectrum of the first frequency spectrum resource adjusting unit by the second frequency spectrum resource adjusting unit satisfies with corresponding service demand, and a weight value is assigned to the directed arc, wherein, the first element of the weight value is the occupied frequency spectrum of the first frequency spectrum resource adjusting unit.

Figure 5A:
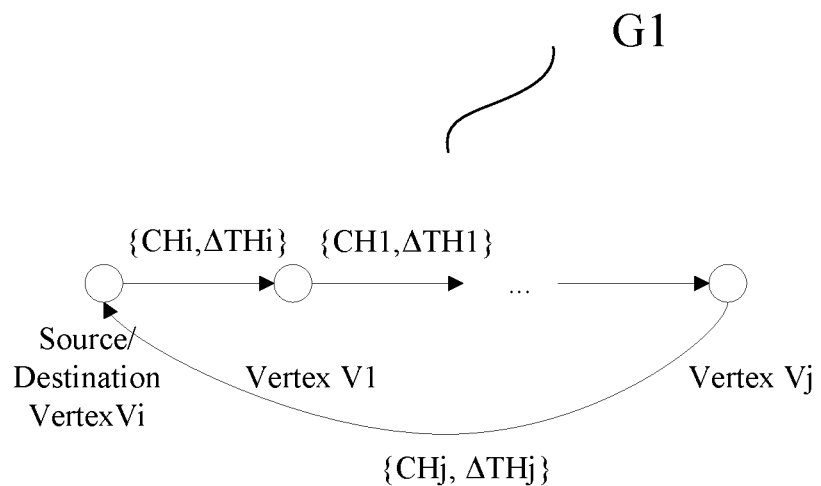
FIGS. 5a and 5b schematically illustrate an example of the frequency spectrum transferring map according to an embodiment of the present disclosure.
Figure 5B:
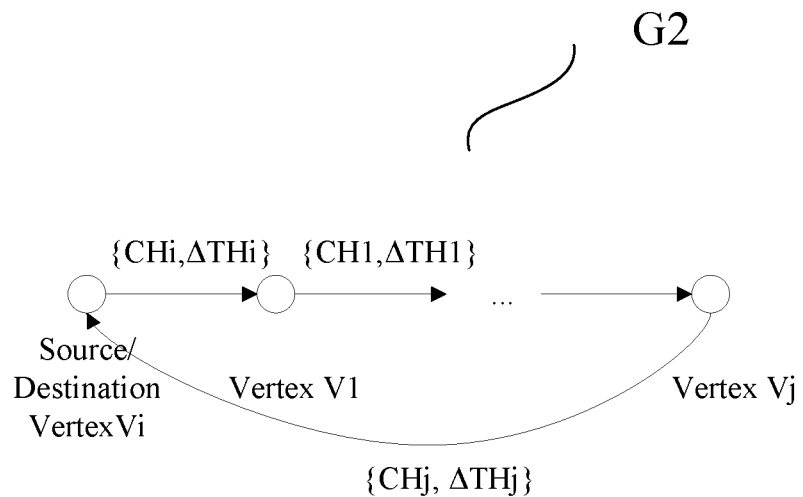

FIG. 5a and FIG. 5b show an example of the frequency spectrum transferring map according to an embodiment of the present disclosure. As shown in FIG. 5a and FIG. 5b, each vertex in frequency spectrum transferring maps G1 and G2 represents one frequency spectrum resource adjusting unit, when the communication system has resources that have not been occupied by any frequency spectrum resource adjusting units for occupancy, one vertex is introduced to represent such a frequency spectrum resource adjusting unit: wherein, it is assumed that the frequency spectrum resource not being allocated to any frequency spectrum resource adjusting unit for occupancy in the present communication system constitutes the occupied frequency spectrum of a frequency spectrum resource adjusting unit. As to any two vertexes Vi and V1, if the frequency spectrum CHi occupied by Vi currently belongs to the available frequency spectrum of V1, and V1 using CHi and the available maximum power thereof can meet the service demand of V1, a directed arc taking Vi as a tail vertex and taking V1 as a head vertex is established and recorded as Vi→V1; and a weight value is assigned to the arc Vi→V1, the weight value includes an element W(Vi→V1) representing the transferred frequency spectrum CHi.

Returning to FIG. 4, when the frequency spectrum transferring map generating module 1221 generates the frequency spectrum transferring map in above way, the frequency spectrum adjusting module 1222 determines the frequency spectrum adjustment to respective frequency spectrum resource adjusting units based on the frequency spectrum transferring map, according to the condition triggering the frequency spectrum adjustment to respective frequency spectrum resource adjusting units.

According to an embodiment of the present disclosure, under condition i, the frequency spectrum adjusting module 1222 is configured for acquiring, from the frequency spectrum transferring map, a directed path taking a frequency spectrum resource adjusting unit corresponding to frequency spectrum in idle as its source vertex and taking a frequency spectrum resource adjusting unit requesting for frequency spectrum as its destination vertex, and determining a frequency spectrum transferring manner from the frequency spectrum resource adjusting unit corresponding to frequency spectrum in idle to the frequency spectrum resource adjusting unit requesting for frequency spectrum based on the directed path.

More specifically, when there are a frequency spectrum resource adjusting unit of which the frequency spectrum resources are released and a frequency spectrum resource adjusting units requesting for frequency spectrum resources in the communication system, the frequency spectrum adjusting module 1222 searches for a directed path taking a frequency spectrum resource adjusting unit corresponding to frequency spectrum in idle as its source vertex and taking a frequency spectrum resource adjusting unit requesting for frequency spectrum as its destination vertex in the frequency spectrum transferring map, from the vertex corresponding to the frequency spectrum resource adjusting unit that releases frequency spectrum resources. For example, in the example shown in FIG. 5a, when the frequency spectrum resource adjusting unit corresponding to vertex Vi releases the frequency spectrum resource CHi, and the frequency spectrum resource adjusting unit corresponding to vertex Vj has a request for frequency spectrum resources, the directed path directing to Vj is searched from the arc having a weight value of CHi, taking the vertex Vi as a start point. If the node to which the arc directs is the vertex Vj corresponding to the frequency spectrum resource adjusting unit requesting for frequency spectrum, it is indicated that the scheme in which the frequency spectrum adjusting demand is satisfied by only one frequency spectrum transferring is found.

Furthermore, when there are frequency spectrum resources not being occupied by any frequency spectrum resource adjusting unit and has a frequency spectrum resource adjusting unit having a request for frequency spectrum resources in the communication system, the frequency spectrum adjusting module 1222 searches for a directed path taking the frequency spectrum resource management apparatus as its source vertex and taking a frequency spectrum resource adjusting unit requesting for frequency spectrum as a destination vertex in the frequency spectrum transferring map, from the vertex corresponding to the frequency spectrum resource management apparatus. For example, in the example shown in FIG. 5a, when the occupied frequency spectrum resource allocated to vertex Vi corresponding to the frequency spectrum resource management apparatus is CHi, and the frequency spectrum resource adjusting unit corresponding to vertex Vj has a request for frequency spectrum resources, the directed path directing to Vj is searched from the arc having a weight value of CHi, taking the vertex Vi as a start point. Similarly, if the node to which the arc directs is the vertex Vj corresponding to the frequency spectrum resource adjusting unit requesting for frequency spectrum resources, it is indicated that the scheme in which the frequency spectrum adjusting demand is satisfied by only one frequency spectrum transferring is found.

When the directed path is found, the frequency spectrum adjusting module 1222 can determine a frequency spectrum transferring manner from the frequency spectrum resource adjusting unit corresponding to the frequency spectrum resource in idle to the frequency spectrum resource adjusting unit requesting for a frequency spectrum resource according to the directed path. For example, when there are a plurality of directed paths, the frequency spectrum adjusting module 1222 can determine the frequency spectrum transferring manner from the frequency spectrum resource adjusting unit corresponding to the frequency spectrum resource in idle to the frequency spectrum resource adjusting unit requesting for frequency spectrum resource according to the directed path that includes least vertexes.

According to an embodiment of the present disclosure, under condition ii, the frequency spectrum transferring map generating module 1221 if further configured for assigning a second element to the weight value of the directed arc, the second element of the weight value is the difference between the throughput generated by the second frequency spectrum resource adjusting unit after occupying the occupied frequency spectrum of the first frequency spectrum resource adjusting unit and the throughput generated when occupying the currently occupied frequency spectrum. For example, as shown in FIG. 5b, the second element of the weight value of the directed arc from the vertex Vi corresponding to the first frequency spectrum resource adjusting unit to the vertex V1 corresponding to the second frequency spectrum resource adjusting unit is recorded as $\Delta TH_{vi}$.

In this case, the frequency spectrum adjusting module 1222 is configured for acquiring, from the frequency spectrum transferring map, a directed ring having a maximum sum (for example, larger than zero) of the second elements of the weight values, and determining the adjustment of frequency spectrum occupancies for respective frequency spectrum resource adjusting units based on the directed ring. For example, in the example shown in FIG. 5b, the sum of the second elements of the weight of respective arcs in each directed ring is recorded as the weight value of the directed ring. An arc having a maximum value for the second element of the weight among respective arcs and a directed ring taking the tail vertex of the arc as the source vertex and the destination vertex at the same time are searched in the frequency spectrum transferring map.

According to a preferred embodiment of the present disclosure, when the frequency spectrum exchange is performed according to the directed ring and the system capacity difference does not exceed the predetermined threshold of system capacity difference, a new frequency spectrum transferring map G1 can be generated according to the occupied frequency spectrum information of the frequency spectrum resource adjusting units corresponding to respective vertexes of the directed ring updated after performing frequency spectrum exchange, and a directed ring with maximum weight value (for example, larger than zero) is searched in G1; the above operations are repeated until the sum of the weight values of all rings exceed the predetermined threshold system capacity difference (in this case, the object adjustment scheme is found), or there is no directed ring that can increase the system capacity in the map.

Furthermore, it will be understood by those skilled in the are that, similar to condition ii, under condition i, the frequency spectrum transferring map generating module 1221 can also be configured for assigning a second element to the weight value of the directed arc, the second element of the weight value is the difference between the throughput generated by the second frequency spectrum resource adjusting unit after occupying the occupied frequency spectrum of the first frequency spectrum resource adjusting unit and the throughput generated when occupying the currently occupied frequency spectrum. In this case, the frequency spectrum adjusting module 1222 can be configured for determining the frequency spectrum adjusting scheme for at least part of the frequency spectrum resource adjusting units based on the second element of the directed arc. For example, see FIG. 5a, the arc with the first term of the weight value being CHi is searched from the vertex Vi, if there are a plurality of arcs, an determination is performed in a descending order with respect to the second term of the weight value of the arc, if the arc directs to the vertex Vj, it is indicated that the scheme in which the object is realized by only one frequency spectrum transferring is found; otherwise, the directed path taking the tail vertex Vi that the arc directs to as the source vertex and taking the vertex Vj corresponding to the frequency spectrum resource adjusting unit requesting for frequency spectrum as the destination vertex is searched in a descending order with respect to the second term of the weight value of the arc.

Returning to FIG. 3, with respect to the frequency spectrum resource adjustment started up under condition iii, the frequency spectrum adjusting unit 122 is configured for determining a frequency spectrum transferring manner for making the frequency spectrum resource adjusting unit requesting for frequency spectrum resources multiplex frequency spectrum resources, according to the frequency spectrum resource transferring information among the frequency spectrum resource adjusting units, to adjust the frequency spectrum occupancies of the frequency spectrum resource adjusting units related to the frequency spectrum transferring, so that the frequency spectrum demand by a frequency spectrum resource adjusting units requesting for a frequency spectrum resource is satisfied.

Figure 6:
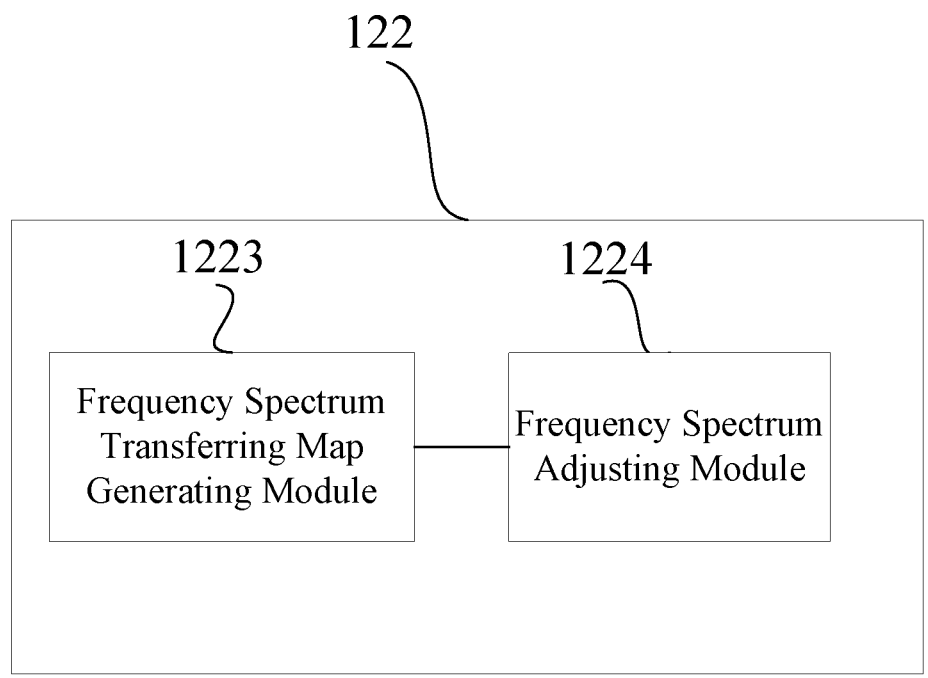
FIG. 6 is a schematic view schematically illustrating another implementation of the frequency spectrum adjusting unit shown in FIG. 3.

FIG. 6 is a schematic view schematically illustrating another implementation of the frequency spectrum adjusting unit 122 shown in FIG. 3.

See FIG. 6, the frequency spectrum adjusting unit 122 comprises a frequency spectrum transferring map generating module 1223 and a frequency spectrum adjusting module 1224.

As shown in FIG. 6, the frequency spectrum transferring map generating module 1223 is configured for generating a frequency spectrum transferring map according to the available frequency spectrum information and the occupied frequency spectrum information of respective frequency spectrum resource adjusting units obtained from the frequency spectrum acquiring device 11, the frequency spectrum transferring map is generated in the following way: each vertex of the frequency spectrum transferring map represents a frequency spectrum resource multiplexing group being constituted of one or more frequency spectrum resource adjusting units having the same available frequency spectrum and the same occupied frequency spectrum; with respect to two frequency spectrum resource multiplexing groups, one directed arc taking the vertex representing the first frequency spectrum resource multiplexing group as a tail vertex and taking the vertex representing the second frequency spectrum resource multiplexing group as a head vertex is established, when an occupied frequency spectrum of a first frequency spectrum resource multiplexing group of two frequency spectrum resource multiplexing groups belongs to an available frequency spectrum of a second frequency spectrum resource multiplexing group and when the occupancy of the occupied frequency spectrum of the first frequency spectrum resource multiplexing group by the second frequency spectrum multiplexing group can satisfy with corresponding service demand, and a weight value is assigned to the directed arc, wherein, the first element of the weight value is the occupied frequency spectrum of the first frequency spectrum resource multiplexing group.

Figure 7:
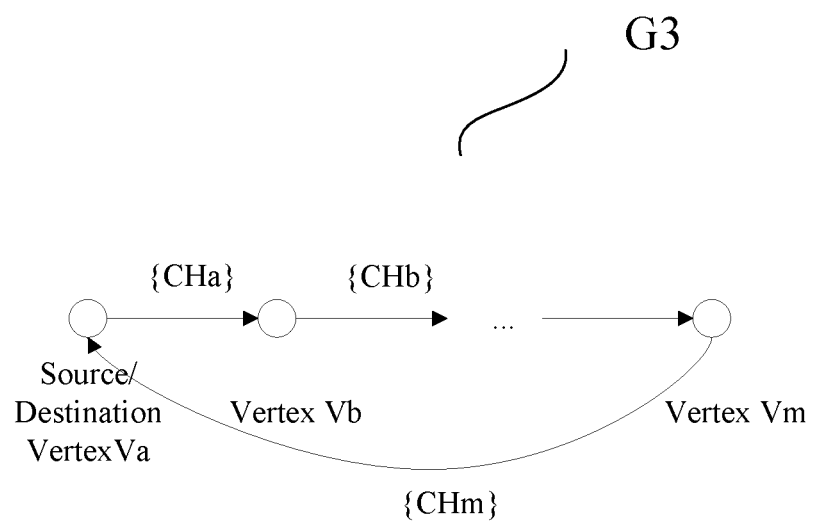
FIG. 7 schematically illustrates another example of the frequency spectrum transferring map according to an embodiment of the present disclosure.

FIG. 7 illustrates an example of the frequency spectrum transferring map according to an embodiment of the present disclosure. As shown in FIG. 7, each vertex V in the frequency spectrum transferring map G3 represents a frequency spectrum resource multiplexing group that comprises a group of secondary systems, wherein, these secondary systems have same available frequency spectrums and same occupied frequency spectrums when the external constraint conditions and internal constraint conditions of the primary systems and the secondary systems are satisfied. As to any two vertexes Va and Vb, if the frequency spectrum CHa occupied by Va currently belongs to the available frequency spectrum of Vb, and Vb uses CHa, the available maximum power thereof can meet the service demand of Vb, a directed arc taking Va as a tail vertex and taking Vb as a head vertex is established and recorded as Va→Vb; and a weight value is assigned to the arc Va→Vb, the weight value includes an element W(Va→Vb) representing the transferred frequency spectrum CHa.

Returning to FIG. 6, when the frequency spectrum transferring map generating module 1223 generates the frequency spectrum transferring map in above way, according to the condition triggering the frequency spectrum adjustment to respective frequency spectrum resource adjusting units, the frequency spectrum adjusting module 1224 determines the frequency spectrum adjustment to respective frequency spectrum resource adjusting units based on the frequency spectrum transferring map.

Specifically, the frequency spectrum adjusting module 1224 is configured for acquiring, from the frequency spectrum transferring map, a directed ring taking a frequency spectrum resource multiplexing group capable of using the same frequency spectrum resource as the frequency spectrum resource adjusting unit requesting for frequency spectrum resources as the start node and taking a directed arc which directs to the start node and of which the weight value is the available frequency spectrum of the frequency spectrum adjusting unit requesting for frequency spectrum resources as its ending side, and determining the adjustment to the frequency spectrum occupancies of respective frequency spectrum resource adjusting units based on the directed ring, so that the frequency spectrum resource adjusting unit requesting for frequency spectrum resources is capable of multiplexing the frequency spectrum resource of the frequency spectrum resource multiplexing group corresponding to the start node.

Figure 8:
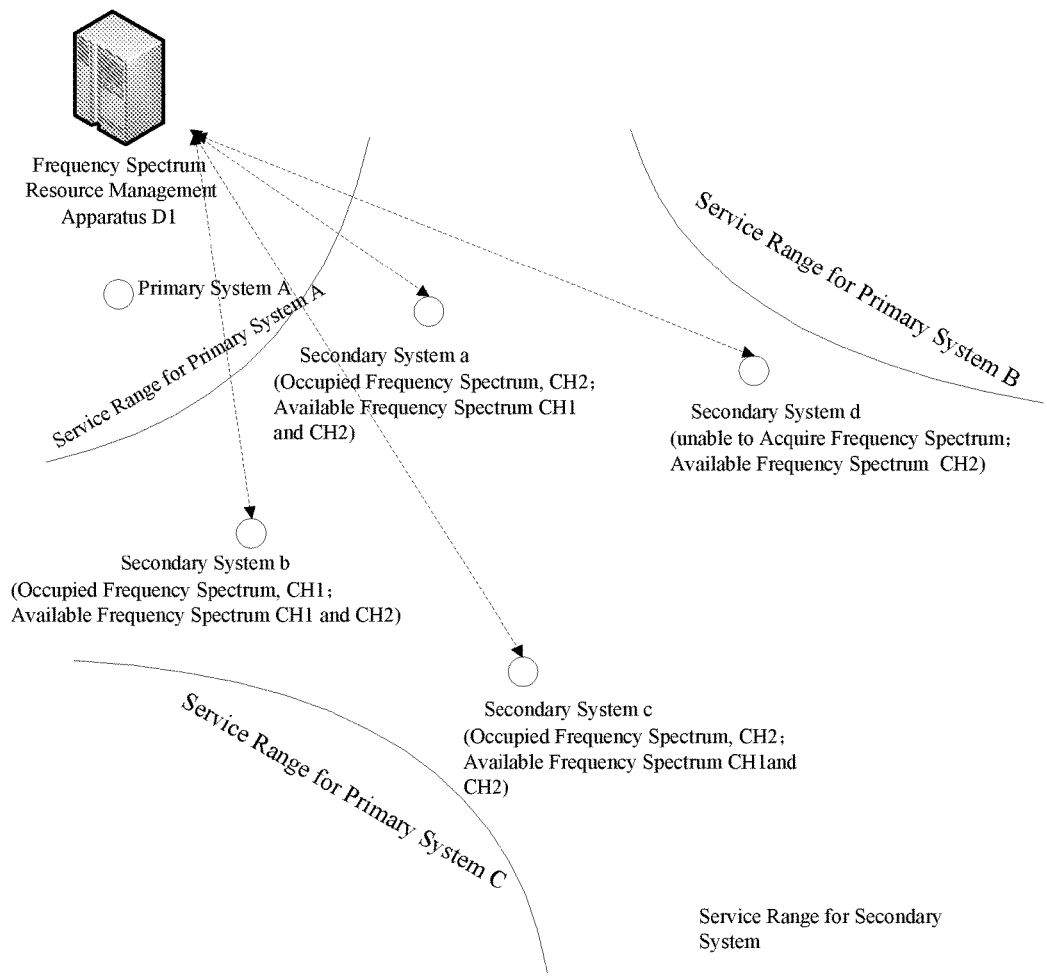
FIG. 8 is an application example illustrating a communication system with transferred frequency spectrum resource according to an embodiment of the present disclosure.

In the following, an example in which the frequency spectrum adjusting module 1222 determines the frequency spectrum adjusting scheme under condition iii is exemplarily described in conjunction with FIG. 8. As shown in FIG. 8, the primary user A occupies the frequency spectrum CH1, the lists of available frequency spectrum of the secondary systems a, b, c all include CH1 and CH2 and the secondary systems a, b, c are occupying the frequency spectrums CH2, CH1, CH2 respectively, at this time, since the available frequency spectrum of the secondary system d determined according to the limitation of the external constraint condition is CH2, and the use of the frequency spectrum will interfere with a and c (that is, the internal constraint condition is not satisfied), d can not acquire the frequency spectrum resource. In this case, the secondary systems a and c that have same occupied frequency spectrums and same available frequency spectrums can constitute a frequency spectrum resource multiplexing group 1, the secondary system b constitutes a frequency spectrum resource multiplexing group 2, and it is found that the secondary system d can multiplex the frequency spectrum CH2 with the secondary system b according to the internal constraint condition and the available frequency spectrum information, so, if the frequency spectrum resource multiplexing group 1 and the frequency spectrum resource multiplexing group 2 exchange resources (that is, the frequency spectrum resource multiplexing group 1 occupies CH1, and the frequency spectrum resource multiplexing group 2 occupies CH2), the secondary system d can acquire the frequency spectrum CH2.

Accordingly, the frequency spectrum adjusting module determines the adjustment to frequency spectrum occupancies of respective frequency spectrum resource adjusting units based on the directed ring, so that the frequency spectrum resource adjusting unit requesting for frequency spectrum resources is capable of multiplexing the frequency spectrum resource of the frequency spectrum resource multiplexing group corresponding to the start node.

According to another preferred embodiment of the present disclosure, in order to decrease the number of re-configuration, when searching for above directed path or directed ring, the directed path or directed ring in which the number of arcs included is the least or the number of arcs included is within predetermined number (for example, the number of the frequency spectrum resource adjusting units set for system re-configuration) may be selected, and the adjustment to at least part of frequency spectrum resource adjusting units is determined based on the directed path or directed ring.

In the frequency spectrum resource adjusting scheme determined by the frequency spectrum adjusting device of the frequency spectrum resource management apparatus according to an embodiment of the present disclosure, only the adjustment to the frequency spectrum occupancy of part of frequency spectrum resource adjusting units in a plurality of frequency spectrum resource adjusting units may be related, so, compared with the prior art that the frequency spectrum resource adjustment needs to be performed on all frequency spectrum resource adjusting units when performing reorganization of resources, the frequency spectrum resource adjusting device according to an embodiment of the present disclosure can improve the efficiency of frequency spectrum resource adjustment.

Figure 9:
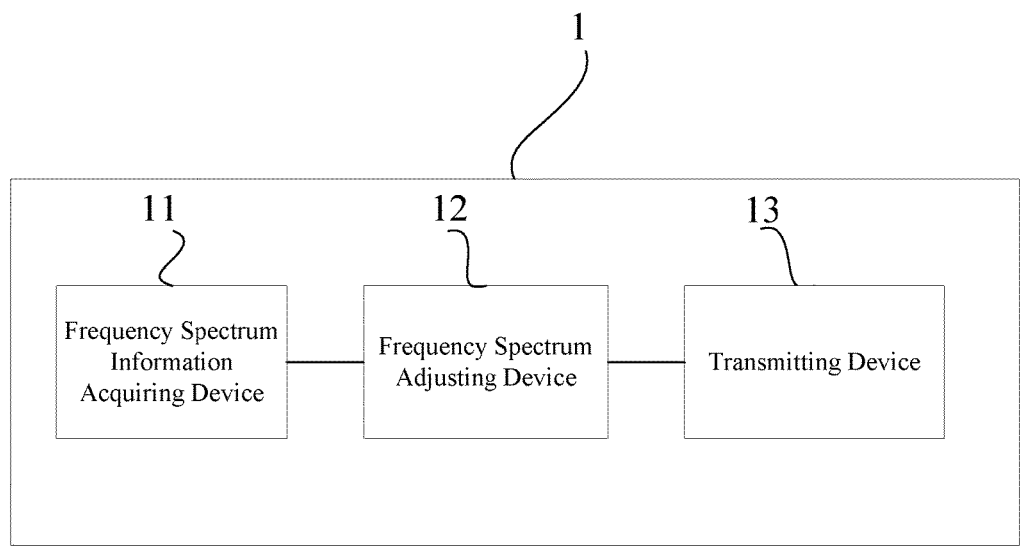
FIG. 9 is an exemplary structure diagram illustrating a frequency spectrum resource management apparatus according to another embodiment of the present disclosure.

FIG. 9 is an exemplary structure diagram illustrating a frequency spectrum resource management apparatus according to another embodiment of the present disclosure.

Besides comprising the frequency spectrum information acquiring device 11 and frequency spectrum adjusting device 12 similar to the frequency spectrum resource management apparatus 1, the frequency spectrum resource management apparatus 2 shown in FIG. 9 comprises transmitting device 13, configured for transmitting to the secondary base station of the secondary system, frequency spectrum adjusting information relating to the frequency spectrum adjustment determined by the frequency spectrum adjusting device 12, so as to adjust the frequency spectrum of respective secondary users in the frequency spectrum resource adjusting units.

According to an embodiment of the present disclosure, the frequency spectrum adjusting information includes ID information of the frequency spectrum resource adjusting units determined to be frequency spectrum adjusted, the frequency spectrum resource information released by the frequency spectrum adjusting units and the frequency spectrum resource information to be occupied by the frequency spectrum resource adjusting units.

Corresponding to the frequency spectrum resource management apparatus according to the first embodiment, the present disclosure provides a frequency spectrum resource management method for performing an adjustment to the frequency spectrum occupancies of a plurality of frequency spectrum resource adjusting units in a communication system including primary systems and secondary systems.

Figure 10:
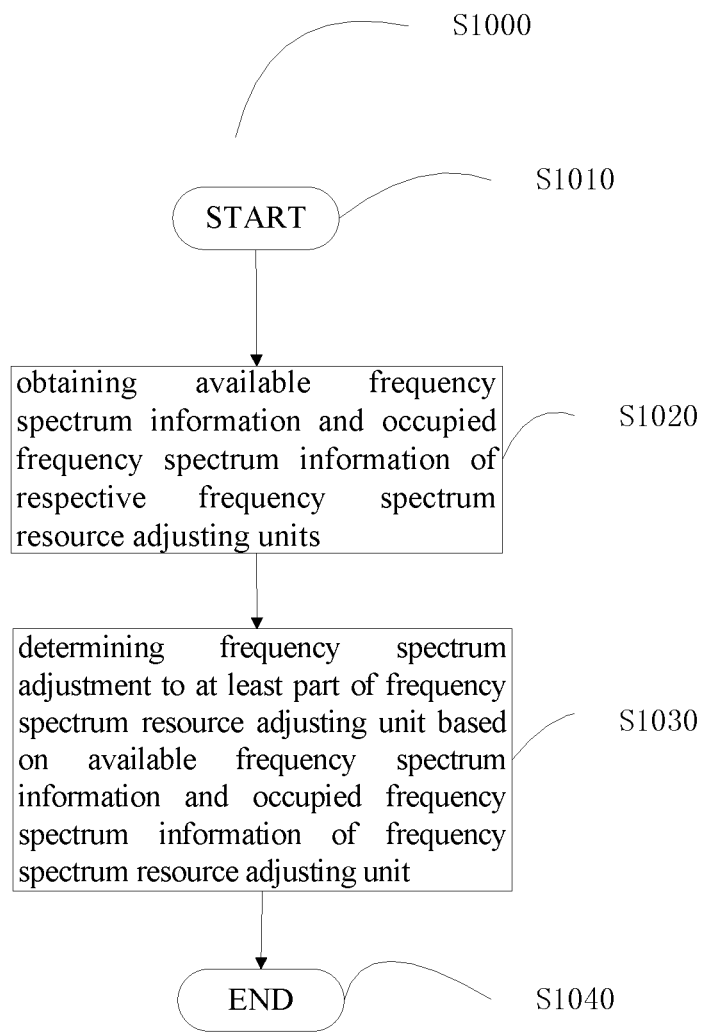
FIG. 10 is a flow chart schematically illustrating a frequency spectrum resource management method according to an embodiment of the present disclosure.

FIG. 10 is a flow chart illustrating a frequency spectrum resource management method according to an embodiment of the present disclosure.

As shown in FIG. 10, the processing flow 1000 of the frequency spectrum resource management method according to an embodiment of the present disclosure begins with S1010, then the process S1020 is performed.

At S1020, acquiring available frequency spectrum information and occupied frequency spectrum information regarding respective frequency spectrum resource adjusting units, wherein, the available frequency spectrum information is the available frequency spectrum of respective frequency spectrum resource adjusting units under the condition that the interferences on the primary systems caused by respective frequency spectrum resource adjusting units are within allowable range of the primary systems, the occupied frequency spectrum information is the occupied frequency spectrum that has been allocated to respective frequency spectrum resource adjusting units for occupancy. For example, it can be implemented by performing the process of respective frequency spectrum information acquiring device 11 described by referring to FIG. 2, and the description thereof is omitted here. Then the process S1030 is performed.

At S1030, determining the frequency spectrum adjustment to at least part of frequency spectrum resource adjusting units in the plurality of the frequency spectrum resource adjusting units, at least based on the available frequency spectrum information and the occupied frequency spectrum information of respective frequency spectrum resource adjusting units. For example, it can be implemented by performing the process of the frequency spectrum adjusting device 12 described by referring to FIGS. 2-7, and the description thereof is omitted here. Then the process S1040 is performed.

The processing flow 1000 is ended at S1040.

In the frequency spectrum resource management method according to an embodiment of the present disclosure, the frequency spectrum resource adjusting unit corresponds to a secondary system or a group of secondary systems in the management range of the frequency spectrum resource management apparatus.

According to a preferred embodiment of the present disclosure, the frequency spectrum resource adjustment is configured for the frequency spectrum adjustment to respective frequency spectrum resource adjusting units within a length of limitation period for the occupied frequency spectrum information.

According to one preferred embodiment of the present disclosure, at S1030, the frequency spectrum resource adjustment further includes: determining frequency spectrum resource transferring information between each two of the frequency spectrum resource adjusting units, based on the available frequency spectrum information and occupied frequency spectrum information regarding respective frequency spectrum resource adjusting units, wherein the frequency spectrum resource transferring information comprises information indicating whether the occupied frequency spectrum of a first frequency spectrum resource adjusting unit in the two frequency spectrum resource adjusting units belongs to the available frequency spectrum of the second frequency spectrum resource adjusting unit; and determining the frequency spectrum adjustment to at least part of frequency spectrum resource adjusting units according to the frequency spectrum resource transferring information.

According to an embodiment of the present disclosure, at S1020, the information regarding the frequency spectrum resource request and the information regarding the frequency spectrum resource in idle are also acquired.

According to an embodiment of the present disclosure, at S1030, the frequency spectrum adjustment further includes triggering the determination of the frequency spectrum adjustment to at least part of frequency spectrum resource adjusting units in the plurality of the frequency spectrum resource adjusting units, when at least one of the following conditions is satisfied: condition i, there are frequency spectrum resources in idle and frequency spectrum resource adjusting units requesting for frequency spectrum resources in the communication system; condition ii, as to an assessing object comprising at least two frequency spectrum adjusting units, the difference between the predicted throughput and the current throughput is larger than a predetermined threshold, wherein the predicted throughput is calculated when the occupancy of the frequency spectrum resources by the frequency spectrum resource adjusting units is under the allowed range for the interference of the primary system; and condition iii, a frequency spectrum resource adjusting unit requesting for frequency spectrum resources in the communication system does not obtain frequency spectrum within a predetermined period of time.

According to an embodiment of the present disclosure, at S1030, the frequency spectrum adjustment further includes determining a frequency spectrum transferring manner from a frequency spectrum resource adjusting unit corresponding to frequency spectrum in idle to a frequency spectrum recourse adjusting unit requesting for a frequency spectrum resource, according to the frequency spectrum resource transferring information among the frequency spectrum resource adjusting units, to adjust the frequency spectrum occupancies for the frequency spectrum resource adjusting units related to the frequency spectrum transferring, so that a frequency spectrum resource demand by a frequency spectrum resource adjusting units requesting for frequency spectrum resources is satisfied.

According to an embodiment of the present disclosure, at S1020, acquiring the available resource information and the occupied resource information further includes receiving, from frequency spectrum resource adjusting units that have occupied the frequency spectrum resources, information regarding its released frequency spectrum resource and taking the released frequency spectrum as frequency spectrum resource in idle.

According to a preferred embodiment of the present disclosure, the frequency spectrum resource transferring information further comprises the difference between the throughput generated by the second frequency spectrum resource adjusting unit of the two frequency spectrum resource adjusting units after occupying the occupied frequency spectrum of the first frequency spectrum resource adjusting unit and the throughput generated when occupying the currently occupied frequency spectrum.

According to an embodiment of the present disclosure, at S1030, the frequency spectrum adjustment further includes determining a frequency spectrum transferring manner for making the throughput of the assessment object after frequency spectrum adjustment meet a predetermined condition, based on the frequency spectrum resource transferring information among the frequency spectrum resource adjusting units, so as to adjust the frequency spectrum occupancies of the frequency spectrum resource adjusting units related to the frequency spectrum transferring.

According to an embodiment of the present disclosure, at S1030, the determination to the frequency spectrum adjustment further includes: generating a frequency spectrum transferring map according to the available frequency spectrum information and the occupied frequency spectrum information of respective frequency spectrum resource adjusting units, the frequency spectrum transferring map is generated in the following way: each vertex of the frequency spectrum transferring map represents one frequency spectrum resource adjusting unit, one directed arc taking the vertex representing the first frequency spectrum resource adjusting unit as a tail vertex and taking the vertex representing the second frequency spectrum resource adjusting unit as a head vertex is established, when the occupied frequency spectrum of the first frequency spectrum adjusting unit belongs to the available frequency spectrum of the second frequency spectrum resource adjusting unit and when the occupancy of the occupied frequency spectrum of the first frequency spectrum resource adjusting unit by the second frequency spectrum resource adjusting unit satisfies with corresponding service demand, and a weight value is assigned to the directed arc, wherein, the first element of the weight value is the occupied frequency spectrum of the first frequency spectrum resource adjusting unit; and determining, according to the condition triggering the frequency spectrum adjustment to respective frequency spectrum resource adjusting units, the frequency spectrum adjustment to at least part of frequency spectrum resource adjusting units in the plurality of the frequency spectrum resource adjusting units, based on the frequency spectrum transferring map.

According to an embodiment of the present disclosure, at S1030, the determination to the frequency spectrum adjustment further includes: after the frequency spectrum transferring map is generated, acquiring from the frequency spectrum transferring map a directed path taking a frequency spectrum resource adjusting unit corresponding to frequency spectrum in idle as a source vertex and taking a frequency spectrum resource adjusting unit requesting for frequency spectrum resource as a destination vertex, and determining a frequency spectrum transferring manner from the frequency spectrum resource adjusting unit corresponding to the frequency spectrum resource in idle to the frequency spectrum resource adjusting unit requesting for frequency spectrum resources based on the directed path.

Furthermore, according to an embodiment of the present disclosure, at S1030, the generation of the frequency spectrum transferring map further includes: assigning a second element to the weight value of the directed arc, the second element of the weight value represents the difference between the throughput generated by the second frequency spectrum resource adjusting unit after occupying the occupied frequency spectrum of the first frequency spectrum resource adjusting unit and the throughput generated when occupying the currently occupied frequency spectrum; and acquiring from the frequency spectrum transferring map, a directed ring having a maximum sum of the second elements of the weight values, and determining the adjustment of frequency spectrum occupancies for respective frequency spectrum resource adjusting units based on the directed ring.

According to an embodiment of the present disclosure, at S1030, the determination to the frequency spectrum adjustment further is used for determining a frequency spectrum transferring manner for making frequency spectrum resource adjusting unit requesting for frequency spectrum resources multiplex frequency spectrum resources, according to the frequency spectrum resource transferring information among the frequency spectrum resource adjusting units, to adjust the frequency spectrum occupancies of the frequency spectrum resource adjusting units related to the frequency spectrum transferring, so that the frequency spectrum demand by a frequency spectrum resource adjusting units requesting for a frequency spectrum resource is satisfied.

According to one preferred embodiment of the present disclosure, at S1030, the determination to the frequency spectrum adjustment further includes: generating a frequency spectrum transferring map according to the available frequency spectrum information and the occupied frequency spectrum information of respective frequency spectrum resource adjusting units, the frequency spectrum transferring map is generated in the following way: each vertex of the frequency spectrum transferring map represents a frequency spectrum resource multiplexing group being constituted of one or more frequency spectrum resource adjusting units having same available frequency spectrum and same occupied frequency spectrum, with respect to two frequency spectrum resource multiplexing groups, one directed arc taking the vertex representing the first frequency spectrum resource multiplexing group as a tail vertex and taking the vertex representing the second frequency spectrum resource multiplexing group as a head vertex is established, when an occupied frequency spectrum of a first frequency spectrum resource multiplexing group of two frequency spectrum resource multiplexing groups belongs to an available frequency spectrum of a second frequency spectrum resource multiplexing group and when the occupancy of the occupied frequency spectrum of the first frequency spectrum resource multiplexing group by the second frequency spectrum multiplexing group can satisfy with corresponding service demand, and a weight value is assigned to the directed arc, wherein, the first element of the weight value is the occupied frequency spectrum of the first frequency spectrum resource multiplexing group; and determining, according to the condition triggering the frequency spectrum adjustment to respective frequency spectrum resource adjusting units, the frequency spectrum adjustment to at least part of frequency spectrum resource adjusting units in the plurality of the frequency spectrum resource adjusting units, based on the frequency spectrum transferring map.

According to one preferred embodiment of the present disclosure, at S1030, the determination to the frequency spectrum adjustment further includes: acquiring, from the frequency spectrum transferring map, a directed ring taking a frequency spectrum resource multiplexing group capable of using the same frequency spectrum resource as the frequency spectrum resource adjusting unit requesting for frequency spectrum resources as a source vertex and taking a directed arc which directs to the source vertex and the weight value thereof is the available frequency spectrum of the frequency spectrum adjusting unit requesting for frequency spectrum resources as its ending side, and determining the adjustment to the frequency spectrum occupancies of respective frequency spectrum resource adjusting units based on the directed ring, so that the frequency spectrum resource adjusting unit requesting for frequency spectrum resources is capable of multiplexing the frequency spectrum resource of the frequency spectrum resource multiplexing group corresponding to the source vertex.

According to a preferred embodiment of the present disclosure, when the frequency spectrum adjustment to at least part of frequency spectrum resource adjusting units of respective frequency spectrum resource adjusting units is determined by S1030, the frequency spectrum adjusting information relating to the frequency spectrum adjustment determined by the frequency spectrum adjusting device is transmitted to the secondary base station of the secondary system, so as to adjust the frequency spectrum of respective secondary users in the frequency spectrum resource adjusting units.

According to one embodiment of the present disclosure, the frequency spectrum adjusting information includes ID information of the frequency spectrum resource adjusting units determined to be frequency spectrum adjusted, information of the frequency spectrum resource released by the frequency spectrum adjusting units and information of the frequency spectrum resource to be occupied by the frequency spectrum adjusting units.

According to an embodiment of the present disclosure, there is further provided a secondary system apparatus for receiving frequency spectrum adjusting information, the frequency spectrum adjusting information includes ID information of frequency spectrum resource adjusting units determined to be frequency spectrum adjusted, information of the frequency spectrum resource released by the frequency spectrum adjusting units and information of the frequency spectrum resource to be occupied by the frequency spectrum adjusting units, wherein, the frequency spectrum adjusting information is configured for adjusting the frequency spectrum occupancies of respective frequency spectrum adjusting units.

For example, the secondary system apparatus may receive the frequency spectrum adjustment information from the frequency spectrum resource management apparatus described referring to FIG. 8, and perform adjustment to the frequency spectrum occupancy by respective secondary users in the secondary system having the secondary system apparatus according to the frequency spectrum adjustment information.

The secondary system apparatus can be either a secondary base station or a secondary user. For example, the secondary system according to an embodiment of the present disclosure is the secondary base station included in the secondary systems a, b, c shown in FIG. 1.

According to an embodiment of the present disclosure, there is further provided a frequency spectrum resource management system for performing an adjustment to the frequency spectrum resource occupancies of a plurality of frequency spectrum resource adjusting units in a communication system, wherein the communication system comprises primary systems and secondary systems.

Figure 11:
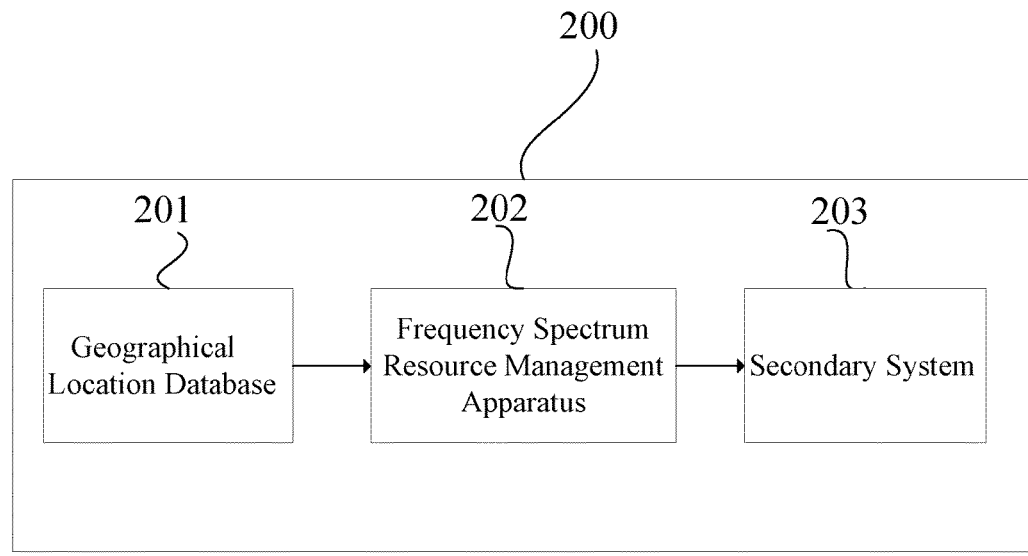
FIG. 11 is a schematic structure block diagram illustrating a frequency spectrum resource management system according to an embodiment of the present disclosure.

FIG. 11 is a schematic structure block diagram illustrating a frequency spectrum resource management system according to an embodiment of the present disclosure.

As shown in FIG. 11, the frequency spectrum resource management system comprises a geographic location database 201, a frequency spectrum resource management apparatus 202 and a secondary system 203.

The geographic location database 201 is configured for providing available frequency spectrum information of respective frequency spectrum resource adjusting units according to a frequency spectrum resource adjusting request. According to an embodiment of the present disclosure, for example, the geographic location database provides functions based on geographic location, such as the available frequency spectrum information regarding each location point; and provides various information (such as the available frequency spectrum information regarding respective locations), for example, stored in the geographic location database in, a database to the frequency spectrum resource management apparatus 202 according to the frequency spectrum resource adjustment request.

The frequency spectrum resource management apparatus 202 is configured for determining adjustment to the frequency spectrum occupancies for respective frequency spectrum resource adjusting units, the frequency spectrum resource management apparatus comprises: a frequency spectrum information acquiring device configured for acquiring available frequency spectrum information regarding respective frequency spectrum resource adjusting units managed by the frequency spectrum resource management apparatus from the geographic location database and acquiring occupied frequency spectrum information of respective frequency spectrum resource adjusting units from the secondary systems, wherein the available frequency spectrum information corresponds to available frequency spectrum related information of respective frequency spectrum resource adjusting units under the condition that the interferences on the primary systems caused by respective frequency spectrum resource adjusting units are within allowable range of the primary systems, the occupied frequency spectrum information corresponds to occupied frequency spectrum related information that has been allocated to respective frequency spectrum resource adjusting units for occupancy; and a frequency spectrum adjusting device configured for determining the adjustment to the frequency spectrum resource occupancies for the at least part of frequency spectrum resource adjusting units in the plurality of the frequency spectrum resource adjusting units, at least based on the available frequency spectrum information and the occupied frequency spectrum information of respective frequency spectrum resource adjusting units. According to an embodiment of the present disclosure, for example, the frequency spectrum resource management apparatus 202 corresponds to the frequency spectrum resource management apparatus 1 described referring to FIGS. 2-7. According to an embodiment of the present disclosure, the frequency spectrum resource management apparatus 202 is further configured for transmitting frequency spectrum adjusting information related to the adjustment to the frequency spectrum occupancies of the at least part of frequency spectrum resource adjusting units.

The secondary system 203 comprises secondary base stations and secondary users and is further configured for receiving the frequency spectrum adjusting information transmitted from the frequency spectrum resource managing apparatus and adjusting the frequency spectrum occupancies of the at least part of frequency spectrum resource adjusting units by using the frequency spectrum adjusting information.

According to one preferred embodiment of the present disclosure, the secondary system 203 is further configured for transmitting the frequency spectrum resource adjusting request, in the case that there is a frequency spectrum resource adjusting unit with frequency spectrum resource in idle in the communication system meanwhile there is a frequency spectrum resource adjusting unit requesting for frequency spectrum resource or in the case that the frequency spectrum resource adjusting unit requesting for frequency spectrum resource in the secondary system does not acquire frequency spectrum resource within a predetermined period of time.

According to another preferred embodiment of the present disclosure, the frequency spectrum resource management apparatus 202 is further configured for assessing the throughput of an assessment object comprising at least two frequency spectrum resource adjusting units, and transmitting the frequency spectrum resource adjusting request when the difference between a predicted throughput and the current throughput of the assessment object is larger than a predetermined threshold, wherein the predicted throughput is calculated under the circumstance that the occupancies of the frequency spectrum resource by the frequency spectrum resource adjusting units satisfy with the allowable range regarding the interference of the primary systems.

Figure 12:
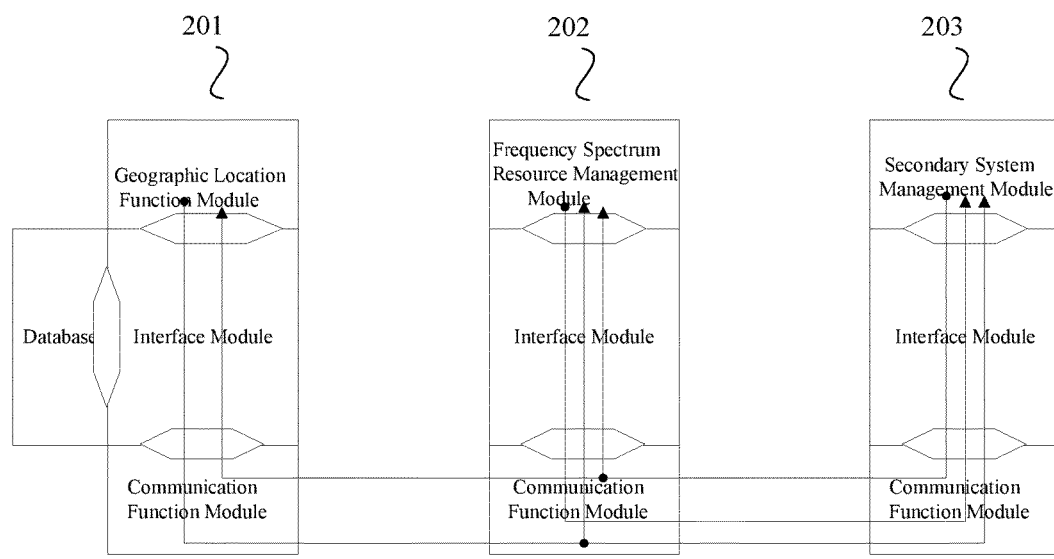
FIG. 12 illustrates a schematic system structure reference model of the frequency spectrum resource management system according to an embodiment of the present disclosure.

FIG. 12 illustrates a schematic system structure reference model of the frequency spectrum resource management system shown in FIG. 11.

As shown in FIG. 12, the geographic location database comprises: a geographic location function module, a database, a communication function module and an interface module. The geographic location function module provides a function based on the geographic location, such as the available frequency spectrum information regarding each location point. The database is configured for storing various information of GLDB, such as the available frequency spectrum list. The communication function module is configured for the information interaction between the GLDB and other functional entity. The interface module performs forwarding management to the signaling received from external entity and the data generated from the interior of GLDB, and address the calculated intermediate data and final data to the object function module. The information exchange among above modules is performed via service interfaces.

The frequency spectrum resource management device 202 comprises a frequency spectrum resource management module, a communication function module and an interface module. The frequency spectrum resource management module provides a function of frequency spectrum management for the secondary systems, such as assessing the system performance, starting up frequency spectrum reconstruction and deciding the frequency spectrum reconstruction scheme, etc. The communication function module is configured for realizing the information interaction between the frequency spectrum management device of the secondary system and other functional entity. The interface function performs forwarding management to the signaling received from external entity and the data generated from the interior of the frequency spectrum management device of the secondary system, and address the calculated intermediate data and final data to the object function module.

The secondary system 203 comprises a secondary system management module, a communication function module and an interface module. The secondary system management module provides the secondary system management function, such as requesting for the available frequency spectrum list for the secondary user, starting up frequency spectrum reconstruction, receiving the result of the frequency spectrum reconstruction, performing re-configuration of the secondary system, etc. The communication function module is configured for realizing the information interaction between the secondary system and other functional entity. The interface function performs retransmission management to the signaling received from external entity and the data generated from the interior of the secondary system, and address the calculated intermediate data and final data to the object function module.

Figure 13:
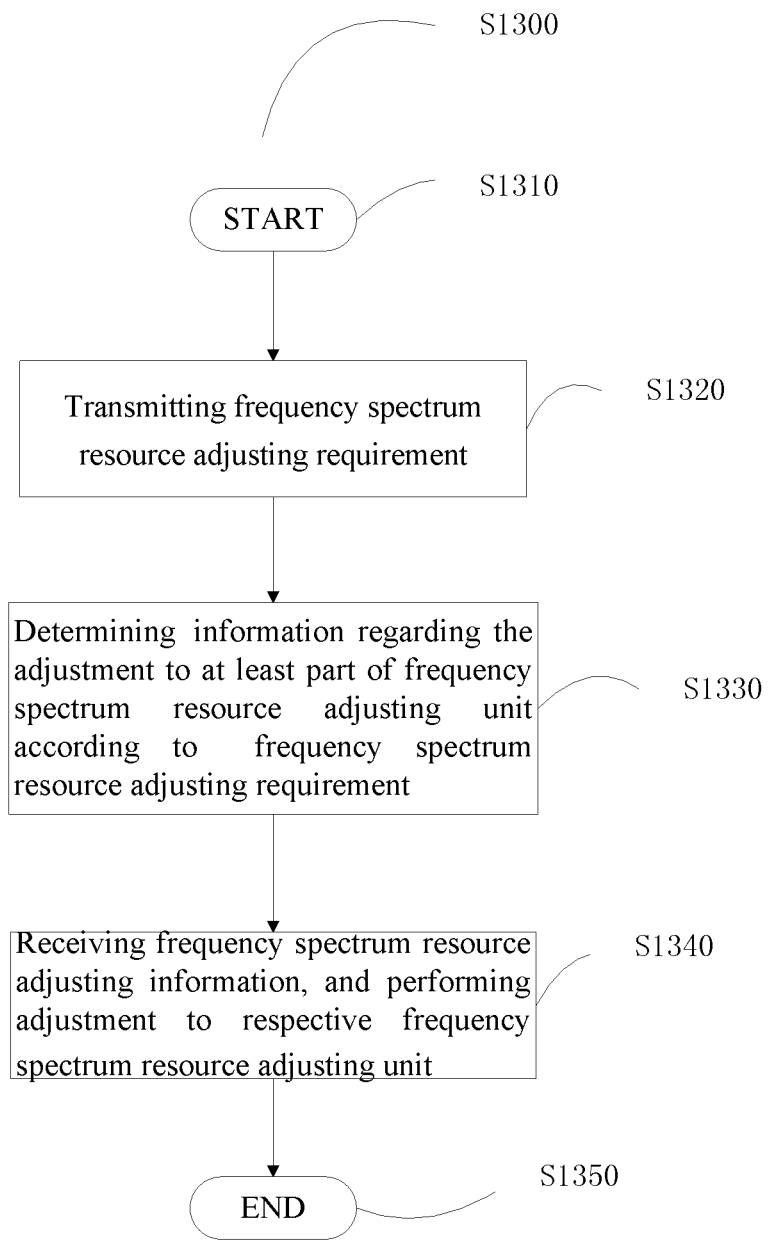
FIG. 13 is a schematic view illustrating a system management method for the frequency spectrum resource management system according to an embodiment of the present disclosure.

FIG. 13 illustrates a system management method for the frequency spectrum resource management system shown in FIG. 11 according to an embodiment of the present disclosure, for performing an adjustment to the frequency spectrum occupancies of the frequency spectrum resource adjusting units in a communication system including primary systems and secondary systems.

As shown in FIG. 13, the processing flow 1300 of the frequency spectrum resource management method according to an embodiment of the present disclosure begins with S1310, then the process S1320 is performed.

At S1320, the frequency spectrum resource adjusting request is transmitted from the secondary system or the frequency spectrum resource management apparatus. Specifically, under the above conditions i and iii, for example, the frequency spectrum resource adjusting request is issued by the secondary system; under the above condition ii, for example, the frequency spectrum resource adjusting request is issued by the frequency spectrum resource management apparatus.

At S1330, the frequency spectrum resource management apparatus determines to perform adjustment to the frequency spectrum occupancies of respective frequency spectrum resource adjusting units according to the available frequency spectrum information of the frequency spectrum resource adjusting units received from the geographic location database and the used frequency spectrum resource information of respective frequency spectrum resource adjusting units. For example, it can be realized by performing the process of the frequency spectrum resource management apparatus 203 described referring to FIG. 11, and the description thereof is omitted here. Then S1340 is performed.

At S1340, the secondary system receives the frequency spectrum adjustment information transmitted from, for example, the frequency spectrum resource management apparatus, and performs adjustment to the frequency spectrum occupancies of at least part of the frequency spectrum resource adjusting units by using the frequency spectrum adjustment information. For example, it can be realized by performing the process of the frequency spectrum resource management apparatus 201 described referring to FIG. 11, and the description thereof is omitted here. Then S1350 is performed.

The processing flow 1300 is ended at S1350.

In the above description, although the frequency spectrum resource management apparatus is disposed to be independent of the geographic location database and the secondary system, the present disclosure is not limited thereto, for example, the frequency spectrum resource management device can be combined with the geographic location database, or the frequency spectrum resource management device can be disposed in the secondary system (such as a secondary base station or a secondary user), in this case, the management to the secondary system resources can be realized by distributed management in the frequency spectrum resource management devices disposed in a plurality of secondary systems.

Compared with the prior art, the frequency spectrum resource management apparatus, method, system and secondary system apparatus according to embodiments of the present disclosure have at least one of the following beneficial effects: more frequency spectrum resources can be provided to the secondary systems at least with the variation of network state through frequency spectrum resource transferring, therefore, the utilization efficiency of the frequency spectrum resource is improved; since it does not need to perform adjustment to the occupied frequency spectrum of all frequency spectrum resource adjusting units during frequency spectrum resource adjustment, the adjustment efficiency of the frequency spectrum resource is improved.

Modules and units in the above device can be configured by way of software, firmware, hardware, or a combination thereof. The specific means or ways that can be used by the configuration are well known by those skilled in the art, which will not be described in detail herein. In the case of software or firmware implementation, programs constituting the software are installed to a computer with a dedicated hardware structure from a storage medium or a network, wherein the computer can execute various functions when being installed various programs.

In the case of implementing the above-mentioned series of processing through software, programs constituting the software are installed from a network such as the Internet or a storage medium such as the removable medium.

Those skilled in the art should understand that, the storage medium is not limited to the removable storage medium that stores programs and is distributed in a separated form with the equipment to provide a program to a user. Examples of the removable storage medium include a magnetic disk (including a floppy disk (registered trademark)), an optical disc (including a compact disc read-only memory (CD-ROM) and a digital versatile disk (DVD)), a magneto-optical disk (including a mini disk (MD) (Registration trademarks) and a semiconductor memory. Or, the storage medium may be ROM, a hard disk contained in the storage part, etc. which have programs stored therein and are distributed to the user together with the apparatus.

The present disclosure also provides a program product in which machine readable instruction codes are stored. The method according to embodiments of the present disclosure can be executed when the instruction code is read and executed by the machine.

Accordingly, the storage medium for carrying the above program product in which the machine-readable instruction codes are stored is also included in the disclosure of the present invention. The storage medium includes but not limited to a floppy disk, an optical disk, a magneto-optical disk, a memory card, a memory stick, etc.

Additionally, the present technology may also be configured as below.

(1). A frequency spectrum resource management apparatus for performing an adjustment to the frequency spectrum resource occupancies of a plurality of frequency spectrum resource adjusting units in a communication system, wherein the communication system comprises primary systems and secondary systems, the frequency spectrum resource management apparatus comprising:

a frequency spectrum information acquiring device configured for acquiring available frequency spectrum information and occupied frequency spectrum information regarding respective frequency spectrum resource adjusting units managed by the frequency spectrum resource management apparatus, wherein, the available frequency spectrum information corresponds to available frequency spectrum related information of respective frequency spectrum resource adjusting units under the condition that the interferences on the primary systems caused by respective frequency spectrum resource adjusting units are within allowable range of the primary systems, the occupied frequency spectrum information corresponds to occupied frequency spectrum related information that has been allocated to respective frequency spectrum resource adjusting units for occupancy; and a frequency spectrum adjusting device configured for determining the frequency spectrum adjustment to at least part of frequency spectrum resource adjusting units in the plurality of the frequency spectrum resource adjusting units, at least based on the available frequency spectrum information and the occupied frequency spectrum information of respective frequency spectrum resource adjusting units.

(2). The frequency spectrum resource management apparatus according to (1), wherein, the frequency spectrum adjusting device is configured for determining the frequency spectrum adjustment to the plurality of the frequency spectrum resource adjusting units within a length of limitation period for the occupied frequency spectrum information.

(3). The frequency spectrum resource management apparatus according to (1) or (2), wherein the frequency spectrum adjusting device comprises:

a frequency spectrum resource transferring information acquiring unit configured for determining frequency spectrum resource transferring information between each two of the frequency spectrum resource adjusting units, based on the available frequency spectrum information and occupied frequency spectrum information regarding respective frequency spectrum resource adjusting units, wherein the frequency spectrum resource transferring information comprises information indicating whether the occupied frequency spectrum of a first frequency spectrum resource adjusting unit in the two frequency spectrum resource adjusting units belongs to the available frequency spectrum of the second frequency spectrum resource adjusting unit; and a frequency spectrum adjusting unit configured for determining the frequency spectrum adjustment to the at least part of frequency spectrum resource adjusting units according to the frequency spectrum resource transferring information.

(4). The frequency spectrum resource management apparatus according to any of (1)-(3), wherein, the frequency spectrum resource adjusting unit corresponds to a secondary system apparatus or a group of secondary system apparatuses within the management range of the frequency spectrum resource management apparatus.

(5). The frequency spectrum resource management apparatus according to (3), wherein, the frequency spectrum information acquiring device is further configured for acquiring information regarding requests for frequency spectrum resources and information regarding frequency spectrum resources in idle.

(6). The frequency spectrum resource management apparatus according to (5), wherein, the frequency spectrum adjusting device is configured for triggering the determination of the frequency spectrum adjustment to at least part of frequency spectrum resource adjusting units in the plurality of the frequency spectrum resource adjusting units managed by the frequency spectrum resource management apparatus, when at least one of the following conditions is satisfied:

condition i, there are frequency spectrum resources in idle and frequency spectrum resource adjusting units requesting for frequency spectrum resources in the communication system;

condition ii, as to an assessing object comprising at least two frequency spectrum adjusting units, the difference between the predicted throughput and the current throughput is larger than a predetermined threshold, wherein the predicted throughput is calculated when the occupancy of the frequency spectrum resources by the frequency spectrum resource adjusting units is under the allowed range for the interference of the primary system; and condition iii, a frequency spectrum resource adjusting unit requesting for frequency spectrum resources in the communication system does not obtain frequency spectrum resource within a predetermined period of time.

(7). The frequency spectrum resource management apparatus according to (6), wherein, the frequency spectrum adjusting unit is configured for determining a frequency spectrum transferring manner from a frequency spectrum resource adjusting unit corresponding to frequency spectrum resource in idle to a frequency spectrum recourse adjusting unit requesting for a frequency spectrum resource, according to the frequency spectrum resource transferring information among the frequency spectrum resource adjusting units, to adjust the frequency spectrum occupancies for the frequency spectrum resource adjusting units related to the frequency spectrum transferring, so that a frequency spectrum demand by the frequency spectrum resource adjusting unit requesting for frequency spectrum resources is satisfied.

(8). The frequency spectrum resource management apparatus according to (6) or (7), wherein, the frequency spectrum information acquiring device is further configured for receiving, from frequency spectrum resource adjusting units having occupied frequency spectrum resources, information regarding its released frequency spectrum resource and taking the released frequency spectrum resource as frequency spectrum in idle.
(9). The frequency spectrum resource management apparatus according to (6), wherein, the frequency spectrum resource transferring information further comprises the difference between the throughput generated by the second frequency spectrum resource adjusting unit of the two frequency spectrum resource adjusting units after occupying the occupied frequency spectrum of the first frequency spectrum resource adjusting unit and the throughput generated when occupying the currently occupied frequency spectrum.
(10). The frequency spectrum resource management apparatus according to (9), wherein, the frequency spectrum adjusting unit is configured for determining a frequency spectrum transferring manner for making the throughput of the assessment object after frequency spectrum adjustment meet a predetermined condition, based on the frequency spectrum resource transferring information among the frequency spectrum resource adjusting units, so as to adjust the frequency spectrum occupancies of the frequency spectrum resource adjusting units related to the frequency spectrum transferring.
(11). The frequency spectrum resource management apparatus according to (7) or (10), wherein, the frequency spectrum adjusting unit comprises:
a frequency spectrum transferring map generating module configured for generating a frequency spectrum transferring map according to the available frequency spectrum information and the occupied frequency spectrum information of respective frequency spectrum resource adjusting units, the frequency spectrum transferring map is generated in the following way: each vertex of the frequency spectrum transferring map represents one frequency spectrum resource adjusting unit, one directed arc taking the vertex representing the first frequency spectrum resource adjusting unit as a tail vertex and taking the vertex representing the second frequency spectrum resource adjusting unit as a head vertex is established, when the occupied frequency spectrum of the first frequency spectrum adjusting unit belongs to the available frequency spectrum of the second frequency spectrum adjusting unit and when the occupancy of the occupied frequency spectrum of the first frequency spectrum resource adjusting unit by the second frequency spectrum resource adjusting unit satisfies with corresponding service demand, and a weight value is assigned to the directed arc, wherein, the first element of the weight value is the occupied frequency spectrum of the first frequency spectrum resource adjusting unit; and
a frequency spectrum adjusting module configured for determining, according to the condition triggering the frequency spectrum adjustment to respective frequency spectrum resource adjusting units, the frequency spectrum adjustment to at least part of frequency spectrum resource adjusting units in the plurality of the frequency spectrum resource adjusting units, based on the frequency spectrum transferring map generated by the frequency spectrum transferring map generating module.
(12). The frequency spectrum resource management apparatus according to (11), wherein, the frequency spectrum adjusting module is configured for acquiring, from the frequency spectrum transferring map, a directed path taking a frequency spectrum resource adjusting unit corresponding to frequency spectrum in idle as a source vertex and taking a frequency spectrum resource adjusting unit requesting for a frequency spectrum resource as a destination vertex, and determining a frequency spectrum transferring manner from the frequency spectrum resource adjusting unit corresponding to the frequency spectrum resource in idle to the frequency spectrum resource adjusting unit requesting for frequency spectrum resources based on the directed path.
(13). The frequency spectrum resource management apparatus according to (11), wherein, the frequency spectrum transferring map generating module is further configured for assigning a second element to the weight value of the directed arc, the second element of the weight value represents the difference between the throughput generated by the second frequency spectrum resource adjusting unit after occupying the occupied frequency spectrum of the first frequency spectrum resource adjusting unit and the throughput generated when occupying the currently occupied frequency spectrum; and
the frequency spectrum adjusting module is configured for acquiring, from the frequency spectrum transferring map, a directed ring having a maximum sum of the second elements of the weight values, and determining the adjustment to the frequency spectrum occupancies for respective frequency spectrum resource adjusting units based on the directed ring.
(14). The frequency spectrum resource management apparatus according to (6), wherein the frequency spectrum adjusting unit is configured for determining a frequency spectrum transferring manner for making the frequency spectrum resource adjusting unit requesting for frequency spectrum resources multiplex frequency spectrum resources, according to the frequency spectrum resource transferring information among the frequency spectrum resource adjusting units, to adjust the frequency spectrum occupancies of the frequency spectrum resource adjusting units related to the frequency spectrum transferring, so that the frequency spectrum demand by a frequency spectrum resource adjusting units requesting for a frequency spectrum resource is satisfied.
(15). The frequency spectrum resource management apparatus according to (14), wherein, the frequency spectrum adjusting unit comprises:
a frequency spectrum transferring map generating module configured for generating a frequency spectrum transferring map according to the available frequency spectrum information and the occupied frequency spectrum information of respective frequency spectrum resource adjusting unit, the frequency spectrum transferring map is generated in the following way: each vertex of the frequency spectrum transferring map represents a frequency spectrum resource multiplexing group being constituted of one or more frequency spectrum resource adjusting units having same available frequency spectrum and same occupied frequency spectrum, with respect to two frequency spectrum resource multiplexing groups, one directed arc taking the vertex representing the first frequency spectrum resource multiplexing group as a tail vertex and taking the vertex representing the second frequency spectrum resource multiplexing group as a head vertex is established, when an occupied frequency spectrum of the first frequency spectrum resource multiplexing group of two frequency spectrum resource multiplexing groups belongs to an available frequency spectrum of the second frequency spectrum resource multiplexing group and when the occupancy of the occupied frequency spectrum of the first frequency spectrum resource multiplexing group by the second frequency spectrum multiplexing group satisfies with corresponding service demand, and a weight value is assigned to the directed arc, wherein, the first element of the weight value is the occupied frequency spectrum of the first frequency spectrum resource multiplexing group; and a frequency spectrum adjusting module configured for determining, according to the condition triggering the frequency spectrum adjustment to respective frequency spectrum resource adjusting units, the frequency spectrum adjustment to at least part of frequency spectrum resource adjusting units in the plurality of the frequency spectrum resource adjusting units, based on the frequency spectrum transferring map generated by the frequency spectrum transferring map generating module.

(16). The frequency spectrum resource management apparatus according to (15), wherein, the frequency spectrum adjusting module is configured for acquiring, from the frequency spectrum transferring map, a directed ring taking a frequency spectrum resource multiplexing group capable of using the same frequency spectrum resource as the frequency spectrum resource adjusting unit requesting for frequency spectrum resources as a source vertex and taking a directed arc which directs to the source vertex and the weight value thereof is the available frequency spectrum of the frequency spectrum adjusting unit requesting for frequency spectrum resources as its ending side, and determining the adjustment to the frequency spectrum occupancies of respective frequency spectrum resource adjusting units based on the directed ring, so that the frequency spectrum resource adjusting unit requesting for frequency spectrum resources is capable of multiplexing the frequency spectrum resource of the frequency spectrum resource multiplexing group corresponding to the source vertex.

(17). The frequency spectrum resource management apparatus according to any one of (1)-(16), wherein the frequency spectrum resource management apparatus further comprises a transmitting device configured for transmitting to the secondary base station of the secondary system, frequency spectrum adjusting information relating to the frequency spectrum adjustment determined by the frequency spectrum adjusting device, so as to adjust the frequency spectrum of respective secondary users in the frequency spectrum resource adjusting units.

(18). The frequency spectrum resource management apparatus according to (17), wherein the frequency spectrum adjusting information includes ID information of the frequency spectrum resource adjusting units determined to be frequency spectrum adjusted, information of the frequency spectrum resource released by the frequency spectrum adjusting units and information of the frequency spectrum resource to be occupied by the frequency spectrum adjusting units.

(19). A secondary system apparatus for receiving frequency spectrum adjusting information, the frequency spectrum adjusting information includes ID information of frequency spectrum resource adjusting units determined to be frequency spectrum adjusted, information of the frequency spectrum resource released by the frequency spectrum adjusting units and information of the frequency spectrum resource to be occupied by the frequency spectrum adjusting units, wherein, the frequency spectrum adjusting information is configured for adjusting the frequency spectrum occupancies of respective frequency spectrum adjusting units.

(20). A frequency spectrum resource management method for performing an adjustment to the frequency spectrum occupancies of a plurality of frequency spectrum resource adjusting units in a communication system, wherein the communication system comprises primary systems and secondary systems, the frequency spectrum resource management method comprising:

acquiring available frequency spectrum information and occupied frequency spectrum information regarding respective frequency spectrum resource adjusting units, wherein, the available frequency spectrum information corresponds to available frequency spectrum related information of respective frequency spectrum resource adjusting units under the condition that the interferences on the primary systems caused by respective frequency spectrum resource adjusting units are within allowable range of the primary systems, the occupied frequency spectrum information corresponds to occupied frequency spectrum related information that has been allocated to respective frequency spectrum resource adjusting units for occupancy; and determining the frequency spectrum adjustment to at least part of frequency spectrum resource adjusting units in the plurality of the frequency spectrum resource adjusting units, at least based on the available frequency spectrum information and the occupied frequency spectrum information of respective frequency spectrum resource adjusting units.

(21). A frequency spectrum resource management system for performing an adjustment to the frequency spectrum occupancies of a plurality of frequency spectrum resource adjusting units in a communication system, the communication system comprises primary systems and secondary systems, the frequency spectrum resource managing system comprises secondary systems, a geographic location database, and a frequency spectrum resource management apparatus, wherein, the geographic location database is configured for providing available frequency spectrum information of respective frequency spectrum resource adjusting units according to a frequency spectrum resource adjusting request;

the frequency spectrum resource management apparatus is configured for determining the adjustment to the frequency spectrum occupancies for respective frequency spectrum resource adjusting units, the frequency spectrum resource management apparatus comprises:

a frequency spectrum information acquiring device configured for acquiring available frequency spectrum information regarding respective frequency spectrum resource adjusting units managed by the frequency spectrum resource management apparatus from the geographic location database and acquiring occupied frequency spectrum information of respective frequency spectrum resource adjusting units from the secondary systems, wherein, the available frequency spectrum information corresponds to available frequency spectrum related information of respective frequency spectrum resource adjusting units under the condition that the interferences on the primary systems caused by respective frequency spectrum resource adjusting units are within allowable range of the primary systems, the occupied frequency spectrum information corresponds to occupied frequency spectrum related information that has been allocated to respective frequency spectrum resource adjusting units for occupancy; and a frequency spectrum adjusting device configured for determining the adjustment to the frequency spectrum resource occupancies of the at least part of frequency spectrum resource adjusting units in the plurality of the frequency spectrum resource adjusting units, at least based on the available frequency spectrum information and the occupied frequency spectrum information of respective frequency spectrum resource adjusting units;

the frequency spectrum resource managing apparatus is further configured for transmitting frequency spectrum adjusting information related to the adjustment to the frequency spectrum occupancies of the at least part of frequency spectrum resource adjusting units;

the secondary systems are configured for receiving the frequency spectrum adjusting information transmitted from the frequency spectrum resource managing apparatus and adjusting the frequency spectrum occupancies of the at least part of frequency spectrum resource adjusting units by using the frequency spectrum adjusting information.

(22). The frequency spectrum resource management system according to (21), wherein the secondary system is further configured for transmitting the frequency spectrum resource adjusting request, in the case that there is a frequency spectrum resource adjusting unit with frequency spectrum in idle in the communication system meanwhile there is a frequency spectrum resource adjusting unit requesting for frequency spectrum resources or in the case that the frequency spectrum resource adjusting unit requesting for frequency spectrum resources in the secondary system does not acquire frequency spectrum resource within a predetermined period of time.

(23). The frequency spectrum resource management system according to (21), wherein the frequency spectrum resource management apparatus is further configured for assessing the throughput of an assessment object comprising at least two frequency spectrum resource adjusting units, and transmitting the frequency spectrum resource adjusting request when the difference between a predicted throughput and the current throughput of the assessment object is larger than a predetermined threshold, wherein the predicted throughput is calculated under the circumstance that the occupancies of the frequency spectrum resource by the frequency spectrum resource adjusting units satisfy with the allowable range regarding the interference of the primary systems.

Finally, as should be further explained, such relational terms as left and right, first and second, etc., when used in the present disclosure, are merely used to differentiate one entity or operation from another entity or operation, without necessarily requiring or suggesting that these entities or operations have therebetween any such actual relation or sequence. Moreover, terms 'comprise', 'include' or other variants and any variants thereof are meant to cover non-exclusive inclusion, so that processes, methods, objects or devices that include a series of elements not only include these elements, but also include other elements not explicitly listed, or further include elements inherent in the processes, methods, objects or devices. Without more restrictions, an element defined by the sentence 'including a . . . ' does not preclude the further inclusion of other identical elements in the processes, methods, objects or devices that include this element.

Although the present disclosure has been disclosed above by the description of specific embodiments of the present disclosure, it will be appreciated that those skilled in the art can design various modifications, improvements and equivalents of the present disclosure within the spirit and scope of appended claims. Such modifications, improvements and equivalents should also be regarded as being covered by the protection scope of the present disclosure.

The invention claimed is:

1. A system for managing utilization of un-licensed frequency spectrum resources for secondary systems, comprising:

a memory; and processing circuitry configured to access the memory and
assign a first un-licensed frequency spectrum resource in an availability time period to a first secondary system, the first un-licensed frequency spectrum resource being available for wireless transmission of the first secondary system during the availability time period and under interference constraints;

determine whether one or more other secondary systems require at least part of the assigned first un-licensed frequency spectrum resource;

in response to a determination that the one or more other secondary systems require the at least part of the first un-licensed frequency spectrum resource, reconfigure operational parameters of the first secondary system to reassign the at least part of the first un-licensed frequency spectrum resource to a second secondary system during the availability time period based on current resource utilization, the operational parameters include available frequency and associated maximum transmit power; and receive a request for an un-licensed frequency spectrum resource from a third secondary system, reassign a second un-licensed frequency spectrum resource occupied by the second secondary system to the third secondary system, and reassign the at least part of the first un-licensed frequency spectrum resource to the second secondary system if the at least part of the first un-licensed frequency spectrum resource cannot be reassigned to the third secondary system for causing intolerable interference to other systems, wherein the circuitry is configured to assign and reassign the first un-licensed frequency spectrum resource under protection of a primary system which is licensed with the un-licensed frequency spectrum resources.

2. The system according to claim 1, wherein the circuitry is configured to reassign the at least part of the first un-licensed frequency spectrum resource during the availability time period to a second secondary system based on the current resource utilization by the first and the second secondary systems.

3. The system according to claim 2, wherein the circuitry is configured to control interference to other secondary systems when reassigning the at least part of first un-licensed frequency spectrum resource to the second secondary system.

4. The system according to claim 2, wherein the circuitry is configured to reassign the first un-licensed frequency spectrum resource to the second secondary system based on location of the second secondary system.

5. The system according to claim 4, wherein
the circuitry is configured to identify, before assigning the at least part of the first un-licensed frequency spectrum resources to the second secondary system and based on the location, that the at least part of the first un-licensed frequency spectrum resource is available to the second secondary system, and
the at least part of the first un-licensed frequency spectrum resource is available to the second secondary system when utilization of the at least part of the first un-licensed frequency spectrum resource by the second secondary system at the location causes interference under tolerance of the primary system.

6. The system according to claim 5, wherein the circuitry is configured to
determine an available frequency spectrum resource of the second secondary system, and
identify the at least part of first un-licensed frequency spectrum resource available to the second secondary system if the at least part of first un-licensed frequency spectrum resource is comprised in the available frequency spectrum resource, and
the available frequency spectrum resource comprises frequencies and associated maximum transmit power calculated based on the location, which can be used by the second secondary system under protection of the primary system.

7. The system according to claim 5, wherein the at least part of the first un-licensed frequency spectrum resource is available to the second secondary system when utilization of the at least part of the first un-licensed frequency spectrum resource by the second secondary system at the location causes interference under tolerance of the primary system and other secondary systems.

8. The system according to claim 4, wherein the circuitry is configured to
receive a request for un-licensed frequency spectrum resource from the second secondary system, and
determine the second secondary system as an object to reassign the at least part of the first un-licensed frequency spectrum resource to.

9. The system according to claim 1, wherein the circuitry is configured to
determine the current resource utilization of the first un-licensed frequency spectrum resource by the first secondary system, and
reassign the at least part of the first un-licensed frequency spectrum resource in case that the at least part of the first un-licensed frequency spectrum resource is unused by the secondary system.

10. The system according to claim 9, wherein the at least part of the first un-licensed frequency spectrum resource is released by the first secondary system before the availability time period expires.

11. The system according to claim 1, wherein the circuitry is configured to assign available frequency and associated maximum transmit power to the first secondary system as the first un-licensed frequency spectrum resource without intolerable interference to the primary system.

12. The system according to claim 1, wherein the circuitry is configured to transmit, to the first secondary system, spectrum adjustment information that indicates the at least part of the first un-licensed frequency spectrum resource is no longer available to the first secondary system.

13. The system according to claim 12, wherein the spectrum adjustment information comprises identity information of at least one of the first secondary system, the at least part of the first un-licensed frequency spectrum resource unavailable to the first secondary system and a second un-licensed frequency spectrum resource assigned to the first secondary system.

14. A method for managing utilization of un-licensed frequency spectrum resources for secondary systems, comprising:
assigning a first un-licensed frequency spectrum resource in an availability time period to a first secondary system, the first un-licensed frequency spectrum resource being available for wireless transmission of the first secondary system during the availability time period and under interference constraints;
determining whether one or more other secondary systems require at least part of the assigned first un-licensed frequency spectrum resource;
in response to a determination that the one or more other secondary systems require the at least part of the first un-licensed frequency spectrum resource, reconfiguring operational parameters of the first secondary system to reassign the at least part of the first un-licensed frequency spectrum resource to a second secondary system during the availability time period based on current resource utilization, the operational parameters include available frequency and associated maximum transmit power;
receiving a request for an un-licensed frequency spectrum resource from a third secondary system;
reassigning a second un-licensed frequency spectrum resource occupied by the second secondary system to the third secondary system; and
reassigning the at least part of the first un-licensed frequency spectrum resource to the second secondary system if the at least part of the first un-licensed frequency spectrum resource cannot be reassigned to the third secondary system for causing intolerable interference to other systems,
wherein the steps of assigning and reassigning the first un-licensed frequency spectrum resource are under protection of a primary system which is licensed with the un-licensed frequency spectrum resources.

15. A system, comprising:
a memory; and
processing circuitry configured to access the memory and
determine a first un-licensed frequency spectrum resource assigned to the system in an availability time period, the first un-licensed frequency spectrum resource being available for wireless transmission of the system during the availability time period and under interference constraints;
receive, in response to a determination that a second secondary system requires at least part of the assigned un-licensed frequency spectrum resource, a first spectrum adjustment information during the availability time period that indicates at least part of the first un-licensed frequency spectrum resource is no longer assigned to the system;
change operational parameters of the system based on the first spectrum adjustment information, the operational parameters including available frequency and associated maximum transmit power; and receive, in response to a determination that a third secondary system requires an un-licensed frequency spectrum resource, a second spectrum adjustment information that reassigns a second un-licensed frequency spectrum resource occupied by the system to the third system and reassign the at least part of the first un-licensed frequency spectrum resource to the system if the at least part of the first un-licensed frequency spectrum resource cannot be reassigned to the third secondary system for causing intolerable interference to other systems, wherein the system operates on the first un-licensed frequency spectrum resource under protection of a primary system which is licensed with the un-licensed frequency spectrum resources.

16. A method for a system, comprising:

determining a first un-licensed frequency spectrum resource assigned to the system in an availability time period, the first un-licensed frequency spectrum resource being available for wireless transmission of the system during the availability time period and under interference constraints;

receiving, in response to a determination that a second secondary system requires at least part of the assigned un-licensed frequency spectrum resource, a first spectrum adjustment information during the availability time period that indicates at least part of the first un-licensed frequency spectrum resource is no longer assigned to the system;

changing operational parameters of the system based on the spectrum adjustment information, the operational parameters including available frequency and associated maximum transmit power; and receiving, in response to a determination that a third secondary system requires an un-licensed frequency spectrum resource, a second spectrum adjustment information that reassigns a second un-licensed frequency spectrum resource occupied by the system to the third system, and reassign the at least part of the first un-licensed frequency spectrum resource to the system if the at least part of the first un-licensed frequency spectrum resource cannot be reassigned to the third secondary system for causing intolerable interference to other systems, wherein the system operates on the first un-licensed frequency spectrum resource under protection of a primary system which is licensed with the un-licensed frequency spectrum resources.

17. A non-transitory computer-readable medium including computer-readable instructions, which when executed by a system for managing utilization of un-licensed frequency spectrum resources for secondary systems, cause the system to:

assign a first un-licensed frequency spectrum resource in an availability time period to a first secondary system, the first un-licensed frequency spectrum resource being available for wireless transmission of the first secondary system during the availability time period and under interference constraints;

determine whether one or more other secondary systems require at least part of the assigned first un-licensed frequency spectrum resource;

in response to a determination that the one or more other secondary systems require the at least part of the first un-licensed frequency spectrum resource, reconfigure operational parameters of the first secondary system to reassign the at least part of the first un-licensed frequency spectrum resource to a second secondary system during the availability time period based on current resource utilization, the operational parameters include available frequency and associated maximum transmit power;

receive a request for an un-licensed frequency spectrum resource from a third secondary system, reassign a second un-licensed frequency spectrum resource occupied by the second secondary system to the third secondary system, and reassign the at least part of the first un-licensed frequency spectrum resource to the second secondary system if the at least part of the first un-licensed frequency spectrum resource cannot be reassigned to the third secondary system for causing intolerable interference to other systems, wherein the system assigns and reassigns the first un-licensed frequency spectrum resource under protection of a primary system which is licensed with the un-licensed frequency spectrum resources.

* * * * *